United States Patent
Davidson et al.

(10) Patent No.: US 7,037,382 B2
(45) Date of Patent: May 2, 2006

(54) THREE-DIMENSIONAL PRINTER

(75) Inventors: Thomas Davidson, Arlington, MA (US); Robert A. Phillips, Acton, MA (US); Andres T. Hernandes, San Antonio, TX (US); David B. Russell, Southboro, MA (US); Kevin Roche, Lowell, MA (US); Walter H. Zengerle, III, Dedham, MA (US); Andrew Berlin, Brighton, MA (US); Joshua P. Kinsley, Arlington, MA (US); Benjamin Daniel Sweet-Block, Cambridge, MA (US); Darul Kisai, Kuala Lumpar (MY)

(73) Assignee: Z Corporation, Burlington, MA (US)

( * ) Notice: Subject to any disclaimer, the term of this patent is extended or adjusted under 35 U.S.C. 154(b) by 124 days.

(21) Appl. No.: 10/260,224

(22) Filed: Sep. 27, 2002

(65) Prior Publication Data

US 2004/0012112 A1    Jan. 22, 2004

Related U.S. Application Data

(63) Continuation-in-part of application No. 09/851,502, filed on May 8, 2001, now Pat. No. 6,989,115, which is a continuation-in-part of application No. 09/416,787, filed on Oct. 13, 1999, now Pat. No. 6,375,874, which is a continuation-in-part of application No. 08/771,009, filed on Dec. 20, 1996, now Pat. No. 6,007,318.

(60) Provisional application No. 60/325,310, filed on Sep. 27, 2001.

(51) Int. Cl.
*B08B 5/00* (2006.01)

(52) U.S. Cl. ............... 134/21; 134/37; 134/104.2; 134/198

(58) Field of Classification Search ........... 134/21, 134/37, 198, 104.2; 264/308
See application file for complete search history.

(56) References Cited

U.S. PATENT DOCUMENTS

| 5,056,460 A | 10/1991 | Vöhringer |
| 5,252,264 A | 10/1993 | Forderhase et al. |
| 5,837,960 A | 11/1998 | Lewis et al. |
| 5,876,550 A | 3/1999 | Feygin et al. |
| 6,007,318 A | 12/1999 | Russell et al. |

(Continued)

FOREIGN PATENT DOCUMENTS

DE    3713794    11/1988

(Continued)

OTHER PUBLICATIONS

*Solid Free-Form Fabrication of Drug Delivery Devices*, Journal of Controlled Release 40 (1996) 77-87.

(Continued)

*Primary Examiner*—Mary Lynn Theisen
(74) *Attorney, Agent, or Firm*—Goodwin Proctor LLP

(57) ABSTRACT

A three-dimensional printer uses inkjet-type printheads to rapidly prototype, or print, a three-dimensional model. A powder feeder includes a conveyor system and a metering system to deliver powder to a build area in measured quantities. The powder feeder also includes a vacuum system for loading powder into a feed reservoir or chamber. The vacuum system can also be used to cleanup excess powder. Other powder control features include powder gutters and magnetic powder plows. During printing, a cleaning system operates to remove powder from the printheads. In the event of a printhead or jet failure, the failure can be detected and corrective measures taken automatically. After printing, the model can be depowdered and infiltrated in an enclosure.

12 Claims, 27 Drawing Sheets

U.S. PATENT DOCUMENTS

| | | | | |
|---|---|---|---|---|
| 6,059,893 | A | * | 5/2000 | Kawasaki ..................... 134/37 |
| 6,231,676 | B1 | * | 5/2001 | Rudd et al. ..................... 134/1 |
| 6,375,847 | B1 | | 4/2002 | Hartmann |
| 6,401,001 | B1 | * | 6/2002 | Jang et al. ................... 700/118 |
| 6,416,850 | B1 | | 7/2002 | Bredt et al. |
| 6,932,935 | B1 | * | 8/2005 | Oberhofer et al. .......... 264/497 |
| 2001/0000434 | A1 | | 4/2001 | Medin |
| 2002/0075349 | A1 | | 6/2002 | Sawicki |
| 2003/0004599 | A1 | | 1/2003 | Herbak |
| 2003/0081047 | A1 | | 5/2003 | Yearout |
| 2003/0159712 | A1 | * | 8/2003 | Blattner et al. ................ 134/2 |
| 2004/0025905 | A1 | * | 2/2004 | Ederer et al. .................. 134/6 |
| 2004/0084814 | A1 | | 5/2004 | Boyd et al. |

FOREIGN PATENT DOCUMENTS

| | | |
|---|---|---|
| EP | 0 289 116 | 11/1988 |
| EP | 1 074 389 | 2/2001 |
| EP | 1 164 020 | 12/2001 |
| EP | 0 949 993 | 11/2002 |
| EP | 1 310 369 | 5/2003 |
| WO | WO 90/03893 | 4/1990 |
| WO | WO 91/12120 | 8/1991 |
| WO | WO 92/08592 | 5/1992 |
| WO | WO 93/08928 | 5/1993 |
| WO | WO 94/19112 | 9/1994 |
| WO | WO 94/26446 | 11/1994 |
| WO | WO 95/34468 | 12/1995 |

OTHER PUBLICATIONS

DTM Corporation A BFGoodrich Company, Sinterstation 2000 User's Guide. Nov. 1993.

Z™406 3D Color Printer User Manual, Apr. 2002, 49 pages.

Rynerson, Michael L., *Evaluation of the Advanced Ceramics Marker for New Applications of Three Dimensional Printing*, May 1995, 169 pages, MIT-Theses 1995-366.

* cited by examiner

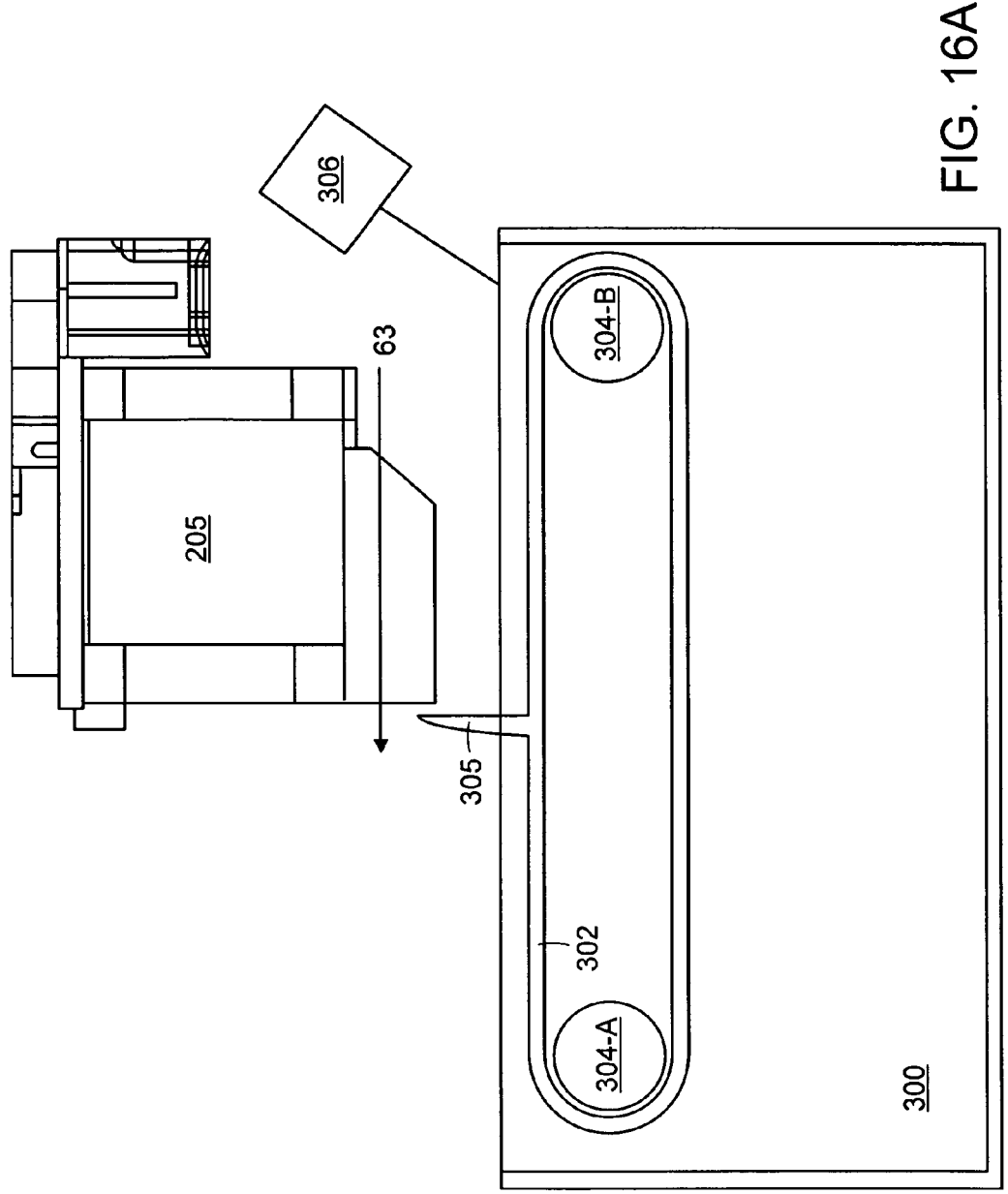

THREE-DIMENSIONAL PRINTER

RELATED APPLICATIONS

This application is a Continuation-in-Part of U.S. application Ser. No. 09/851,502, filed May 8, 2001, now U.S. Pat. No. 6,898,115, which is a Continuation-in-Part of U.S. application Ser. No. 09/416,787, filed Oct. 13, 1999, now U.S. Pat. No. 6,375,874 which is a Continuation-in-Part of U.S. application Ser. No. 08/771,009, filed Dec. 20, 1996 now U.S. Pat. No. 6,007,318. This application also claims the benefit of U.S. Provisional Application Ser. No. 60/325,310, filed Sep. 27, 2001. The entire teachings of the above applications are incorporated herein by reference in their entirety.

BACKGROUND

Rapid prototyping describes various techniques for fabricating a three-dimensional prototype of an object from a computer model of the object. One technique is three-dimensional printing whereby a special printer is used to fabricate the prototype from a plurality of two-dimensional layers. In particular, a digital representation of a 3-D object is stored in a computer memory. Computer software sections the representation of the object into a plurality of distinct 2-D layers. A 3-D printer then fabricates a layer of material for each layer sectioned by the software. Together, the various fabricated layers form the desired prototype.

An apparatus to build a three-dimensional part from powder typically includes a powder supply and a build surface. Powder is transferred from the powder supply to the build surface in incremental layers. In one method of three-dimensional printing, layers of a powder material are deposited in a confined area. A binder solution is selectively deposited on each layer to produce regions of bound powder. A typical apparatus to deposit the binder is an inkjet-type printhead. The unbound powder is then removed to yield a three-dimensional part.

SUMMARY

The use of powder as a build material results in potential problems. Because the powder can easily become airborne, it can adversely affect the machinery, the final product, or human users. The powder can become airborne during various stages of the printing process: from loading the machine to cleanup. In addition, the accumulation of excess powder, whether airborne or not, can lead to maintenance problems within the printer. Prior 3-D printers have had problems controlling the powder.

In accordance with a particular aspect of the invention, an embodiment of a three-dimensional printer can include an apparatus that can comprise a feed reservoir, a vacuum system, a build chamber, and an overflow cavity. The feed reservoir stores a supply of build material for forming the object. The build chamber receives incremental layers of the build material from the feed reservoir. The overflow cavity receives an excess quantity of the build material transferred from the feed reservoir but not received by the build chamber.

The vacuum system can have its inlet plumbed to the feed reservoir. The vacuum system can then be used to transfer build material into the feed reservoir from various sources. More particularly, the vacuum system can be used to draw build material into the feed reservoir through a conduit attached to the inlet of the vacuum system.

For example, the vacuum system can be configured to fill the feed reservoir from a container of build material. This can further include a device for injecting air into the container of build material. The vacuum system can also be configured to remove loose powder from the build chamber after the object has been fabricated and to transfer the loose powder to the feed reservoir. The vacuum system can also be configured to empty the overflow cavity and transfer the build material to the feed reservoir. The vacuum system can also be configured to clean up powder deposited on or near the feed reservoir or the build chamber and return the cleaned-up powder to the feed reservoir. Any of the above examples can be automated or done manually by the user.

The apparatus can also include a system for removing relatively large particles from the powder and returning the powder to the feed reservoir. That system can induce a cyclonic action to a flow stream of powder and air. The flow stream can pass through a separator screen before entering the feed reservoir.

The apparatus can also include a filter disposed within the vacuum system and a system to clean the filter. In the case of a plurality of filters, a cleaning system can then be used to clean the filters. In particular, a reversed airflow can be delivered sequentially through each of the filters. In that case, the cleaning system could include valves to close the vacuum source to a single filter outlet and to then divert air at about atmospheric pressure into the same outlet, reversing flow direction and blowing off accumulated particles. Other filters in the system can be used to maintain airflow and vacuum inside the vacuum chamber while one or more of the filters are being cleaned by reverse airflow.

Not only is it difficult to control the dissipation of the powder, it can be difficult to transfer the powder from the powder supply to the build area. First, the powder becomes compacted in the powder supply and tends to clump into structures, such as bridges. Second, it can be difficult to deliver the powder in a smooth layer, which can lead to part defects. Finally, too much powder can be transferred, which leads to wastage and contributes to the buildup of excess powder and the amount of airborne powder.

In accordance with another particular aspect of the invention, an embodiment of a three-dimensional printer can include a chamber for storing build material below the plane of the build surface and a conveyor. The conveyor can be coupled to the chamber and then be used for moving the build material. In addition, the conveyor can stir the build material within the chamber toward inhibiting the formation of bridges of build material or stagnant areas.

More particularly, the conveyor can include a plurality of slats attached to two strands of a conveyor chain, each slat dimensioned to carry a quantity of build material. The slats can be shaped so as to be stiff without increasing the volume of build material deliverable by each slat. Specifically, the slats can be shaped so that the moment created when they are dragged through the volume of build material tends to wrap the conveyor chain onto a sprocket or a pulley. In addition, the slats can be shaped so that the moment created when the powder-carrying portion of the slat is dragged through the powder is cancelled by the moment created when the stiffener is dragged through the powder. The conveyor system can be configured to deposit build material in front of a spreader roller or a doctor blade, such as through alignment and orientation of the slats.

A metering system can be used regulate the quantity of build material deposited. In one embodiment, the conveyor system can be an augur in a tube or pipes. The augur can then be rotatable to lift powder from the bottom of the feed reservoir to the metering system.

In another embodiment, the metering system can comprise a cylinder inside a closely fitting tube. In this embodiment, the cylinder can have a cavity to hold a particular volume of build material and the tube can have a entrance slot and an exit slot. The cylinder can then be rotatable inside the tube so that build material enters the cavity and is carried to the exit slot. More specifically, a clearance between the cylinder and tube is sized to restrict unwanted powder flow between the inlet slot and the outlet slot. Furthermore, a flicker blade can be rotatable counter to the metering cylinder so that the flicker blade scrapes build material out of the cavity to prevent build material from sticking therein.

In another embodiment, various mechanisms can be used to break bridges and keep the build material flowing into the metering system. For example, a paddle wheel can be configured to agitate the build material above the metering system. As another example, a vibrating member can be used to agitate the build material and can be coupled to the chamber.

In accordance with another particular aspect of the invention, an embodiment of a three-dimensional printer can include a chamber for storing build material above the plane of the build surface and a metering system. The metering system can be used to regulate the quantity of build material delivered by the feed reservoir.

In particular, the metering can comprise a cylinder inside a closely fitting tube. In this embodiment, the cylinder can have a cavity to hold a particular volume of build material and the tube can have a entrance slot and an exit slot. The cylinder can then be rotatable inside the tube so that build material enters the cavity and is carried to the exit slot. More specifically, a clearance between the cylinder and tube is sized to restrict unwanted powder flow between the inlet slot and the outlet slot.

In another embodiment, various mechanisms can be used to break bridges and keep the build material flowing into the metering system. For example, a paddle wheel can be configured to agitate the build material above the metering system. As another example, a vibrating member can be used to agitate the build material and can be coupled to the chamber.

The chamber and metering system can be mounted to a gantry capable of moving across a build chamber. The powder can be metered onto the build chamber to form a smooth layer. Specifically, the powder can be metered in front of a roller or a doctor blade to create the smooth layer.

Once the three-dimensional part is done being printed, it is surrounded by unbound powder. That unbound powder must be removed to reveal the printed object. Again, a technique is needed to mitigate the spread of the lose powder. Because most of the powder may be unbound, instead of bound as the part, there is an economic incentive to recycle the unbound powder.

In accordance with another particular aspect of the invention, an embodiment of a three-dimensional printer includes an apparatus for removing loose powder from the surface of a three-dimensional printed object. A particular apparatus can include an enclosure for holding the object, a blower for creating an airflow, at least one filter for removing powder from the airflow, a system of ducts for channeling the airflow to the enclosure, and a tool for blowing compressed air onto the object.

More particularly, the ducts can direct at least one portion of the exhaust of the blower down across the opening of the enclosure to prevent powder from being ejected from the booth. Furthermore, the ducts can direct at least a portion of the exhaust of the blower downward throughout the enclosure to eliminate stagnant air pockets and create a generalized airflow from top to bottom of the enclosure. The airflow can be divided between the air curtain and the generalized downward flow by diverting the airflow through a duct in which there is very little pressure drop.

In addition, the enclosure can be an integral part of the 3-D printer and the removal of loose powder occurs in the enclosure that houses the 3-D printer. The apparatus can also include a back pulse cleaner to remove powder from the filter and a chamber for receiving the removed powder. The powder removed from the filter can be automatically recycled by an integral vacuum system.

Inkjet-type printheads are used to deliver binder to the layers of powder. Another problem with working with powder is that the powder tends to collect on the printheads. If the powder is left to accumulate for a significant period of time, it can clog the jets. There is therefore a need to keep the printheads clean. There is also a need to detect faulty jets or printheads and to compensate for the failures.

In accordance with another particular aspect of the invention, an embodiment of a three-dimensional printer can include a structural frame, a build chamber supported by the frame and suited to be filled with a build material, a gantry mounted for displacement across the build chamber, a printhead mounted on the gantry, a printhead cleaning element for cleaning the printhead, and a cleaning system for cleaning the printhead cleaning element.

In particular, the cleaning system can include a supply of a cleaning fluid and a mechanism for immersing the printhead cleaning element into the cleaning fluid. To promote cleaning, the cleaning fluid can be agitated by ultrasonic vibration or by circulating the cleaning fluid with a pump. Air can also be injected into the cleaning fluid to increase the agitation.

Structurally, the printhead cleaning element can be mounted to a moveable belt. The cleaning system can also include a mechanism for wiping the printhead cleaning element across a stationary surface. The stationary surface can be wetted with the cleaning fluid. The stationary surface can be immersable in the cleaning fluid.

In accordance with another particular aspect of the invention, an embodiment of a three-dimensional printer can include a structural frame, a build chamber supported by the frame and suited to be filled with a build material, a gantry mounted for displacement across the build chamber, a printhead mounted on the gantry, and a printhead failure detector for detecting if the printhead is functioning properly.

Various mechanisms can be used in the printhead failure detector. For example, the printhead failure detector can be an optical drop detector. As another example, the printhead failure detector can include a membrane at which drops are fired by the printhead, where the drops can be detectable by a microphone that detects the impact of the drops on the membrane. As yet another example, the printhead failure detector can include a piezo-electric element. Furthermore, in either case, the printhead failure detector can detect the firing of individual jets of the printhead or a group of jets being fired simultaneously.

When the printhead is an array of more than one printhead, the mode of operating the printer can be altered in response to a detected failure of a printhead. Specifically, the printing process can be changed so that more than one pass is made over each area of the object being printed. This can allow each area of the object to be printed by more than one area of the array of printheads.

When the printhead is an array of 4 or more printheads, in which at least one printhead is supplied with a binder containing a colorant for each of the primaries, the mode of operating the printer can be altered in response to a detected failure of a printhead. Specifically, printing can be changed from color to a multi-pass monochrome mode.

When the printhead is an array of more than one printhead, the mode of operating the printer can be altered in response to a detected failure of a printhead on one end of the array. Specifically, the printing process is changed so that the width of the printhead array is redefined.

After the part is removed from the mass of powder, it can be post-processed. One step in the post-processing stage is infiltration. Infiltration involves applying a resin to the porous part. The resins are typically adhesives that should be contained.

In accordance with another particular aspect of the invention, an embodiment of a three-dimensional printer can include an apparatus for infiltrating a liquid into a three-dimensional printed part. The infiltration apparatus can include an enclosure for holding the part, a filtration system to remove infiltrant aerosols, and a sprayer for spraying infiltrant on the part.

In particular, the enclosure can be disposable. A filter element can also be incorporated into the disposable enclosure.

The filtration system can include a system for creating airflow through a filter element. The system for creating airflow can be a booth and the enclosure can be a disposable liner that prevents the booth from becoming coated with infiltrant.

The sprayer can include a peristaltic pump, disposable tubing, and a disposable spray nozzle. The spray nozzle can create an aerosol spray of the infiltrant. The peristaltic pump can be a two-head pump and the infiltrant can be a two-component material. The two components can be mixed in a mixing chamber prior to entering the spray nozzle. The components can further be pumped through separate tubes, at the same rate by the pump. The two-component material, in particular, can have a fixed mixing ratio and the inside diameters of the separate tubes can be fixed in the same ratio so that the mixing ratio is maintained.

It should be understood that elements of the above embodiments can be combined in various ways and are not exclusive to the described embodiments.

BRIEF DESCRIPTION OF THE DRAWINGS

The foregoing and other objects, features and advantages of the Three-Dimensional Printer will be apparent from the following more particular description of particular embodiments of the invention, as illustrated in the accompanying drawings in which like reference characters refer to the same parts throughout the different views. The drawings are not necessarily to scale, emphasis instead being placed upon illustrating the principles of the invention.

FIGS. 16A–16B are schematics of a particular cleaning station 300.

DETAILED DESCRIPTION

Figure 1:
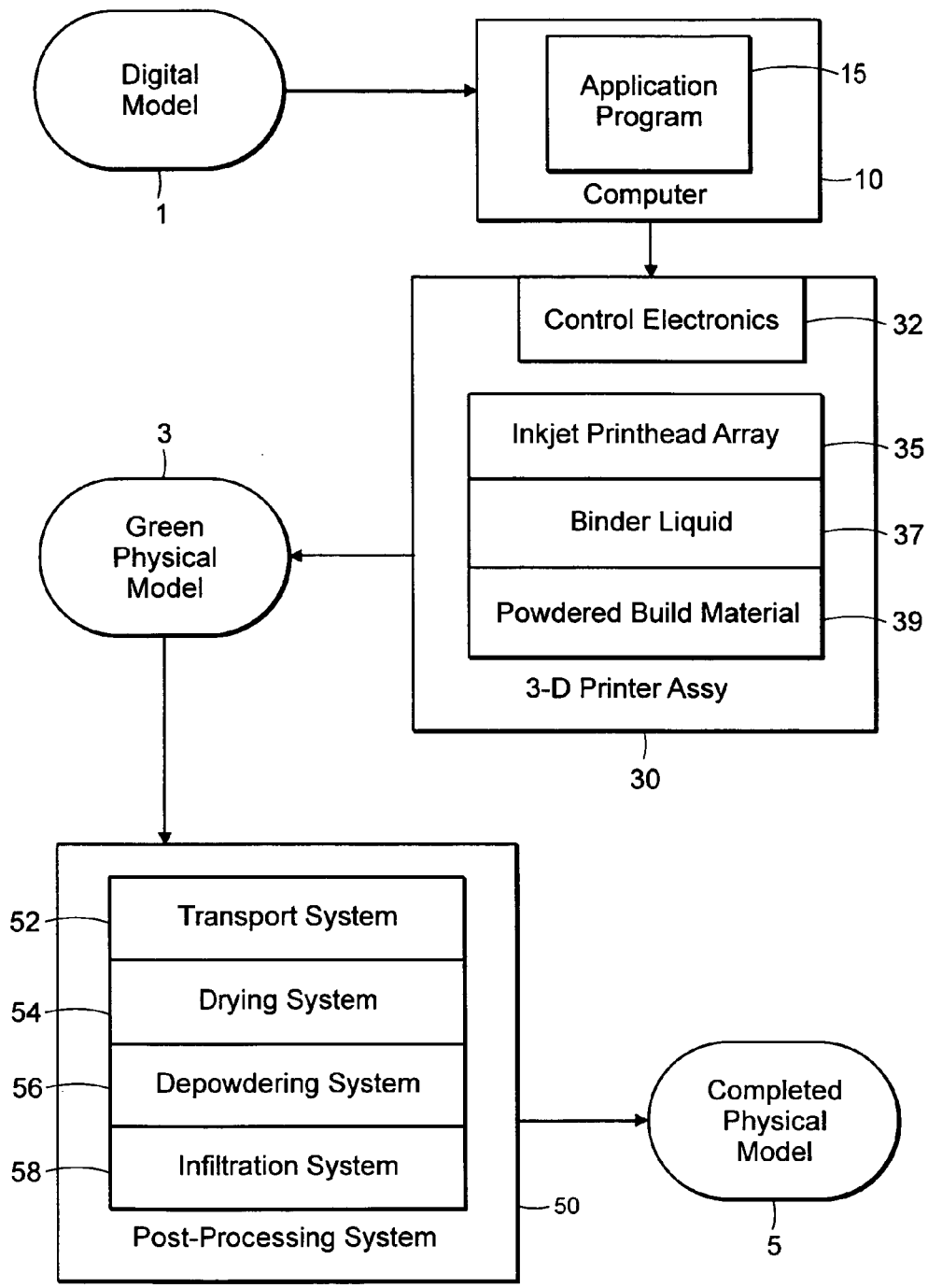
FIG. 1 is a schematic of a particular apparatus for rapid prototyping.

FIG. 1 is a schematic of a particular apparatus for rapid prototyping. As illustrated, there is a digital model 1, a computer 10, a three-dimensional (3-D) printer assembly 30, an as-printed (green) 3-D physical model 3, a post-processing system 50, and a completed 3-D physical model 5.

The digital model 1 is a data representation of an object to be 3-D printed, that is, a digital object to be rendered into a tangible physical entity. Suitable digital models may be created using Computer Aided Design (CAD) software applications or 3-D scanning systems, both of which are available from many different suppliers. The digital models are stored in industry-standard file formats, which can be transmitted electronically and interpreted by application programs running on standard computer equipment.

The computer 10 can be a personal computer, such as a desktop computer or a portable computer. The computer can be a stand-alone computer or a part of a network.

The computer 10 runs a custom software application program 15, which reads digital model files, accepts parameter and preference input from the user, performs a series of detailed calculations and transmits to the 3-D printer assembly 30 the information needed to fabricate the desired physical model. In particular, the application program 15 allows the user to arrange one or more digital models in a virtual volume representing the actual fabrication space within the 3-D printer 30. The application program 15 then slices the array of digital models into a plurality of two-dimensional (2-D) layers, each of a predetermined thickness, which are transmitted to an electronic control circuitry 32 housed within the 3-D printer 30.

The 3-D printer 30 uses an array of ink jet type printheads 35 to deposit binder liquid 37 onto successive layers of a powdered build material 39, such as, disclosed in U.S. Pat. No. 5,902,441 to Bredt, et al., the teachings of which are incorporated herein by reference in their entirety. Where the binder liquid 37 combines with the powdered build material 39, the powder reacts and hardens. By controlling the placement of binder droplets from these printheads, the solid structure of the 2-D cross section can be physically reproduced. The 3-D printer fabricates a physical layer for each sectioned layer provided by the application program 15. When the complete set of 2-D cross sections has been processed, a 3-D physical model 3 has been formed. The model at this stage is termed "green" to indicate an as-printed condition, prior to post-processing. Further details of binding a powder to form an object are disclosed in U.S. Pat. Nos. 5,340,656 to Sachs et al. and 5,387,380 to Cima et al., the teachings of which are incorporated herein by reference in their entirety.

The post-processing system 50 may be used to produce completed physical models 5 by improving the appearance and the physical properties of green physical models 3. The post-processing system 50 may optionally a transport subsystem 52 for handling and transporting printed models, a drying subsystem 54 for completely drying physical models, a depowdering subsystem 56 for thoroughly removing the residual powdered build material from printed models, and an infiltration subsystem 58 for coating and infiltrating printed models with various substances.

Figure 2:
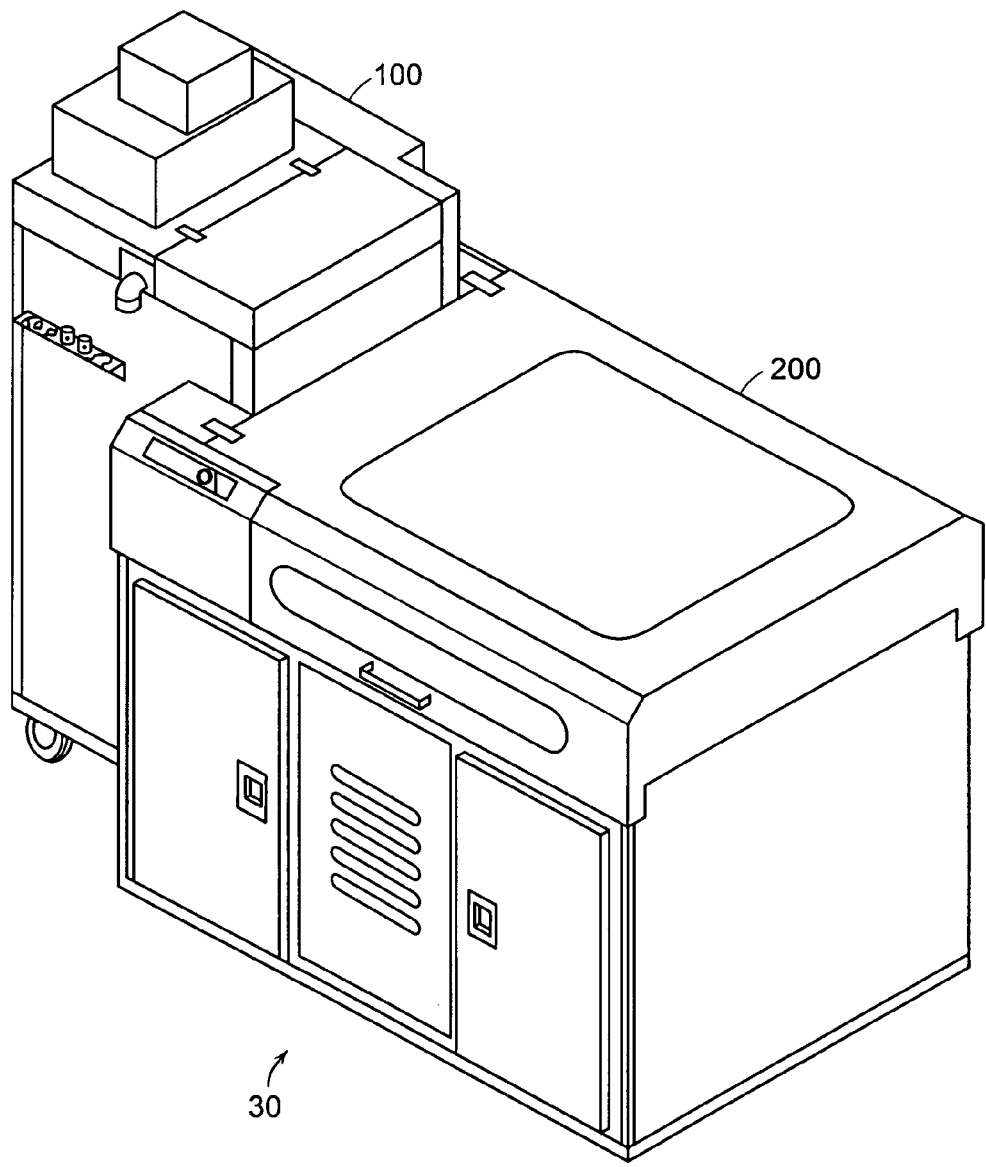
FIG. 2 is a perspective view of the 3-D printer assembly of FIG. 1.

FIG. 2 is a perspective view of the 3-D printer assembly of FIG. 1. Its constituent subassemblies include a powder feeder 100 and a printer unit 200. The powder feeder 100 and the printer 200 can be easily uncoupled from each other for shipping, service and cleaning. Further, the user has the option of maintaining several interchangeable powder feeders 100 for use with a single printer unit 200, each feeder containing a different powdered build material to facilitate easy changeover from one material to another.

The following description describes particular features of the 3-D printer assembly 30. The headings are meant as a guide to the reader and should not be considered limiting to the claimed invention.

Power Feeder

Figure 3:
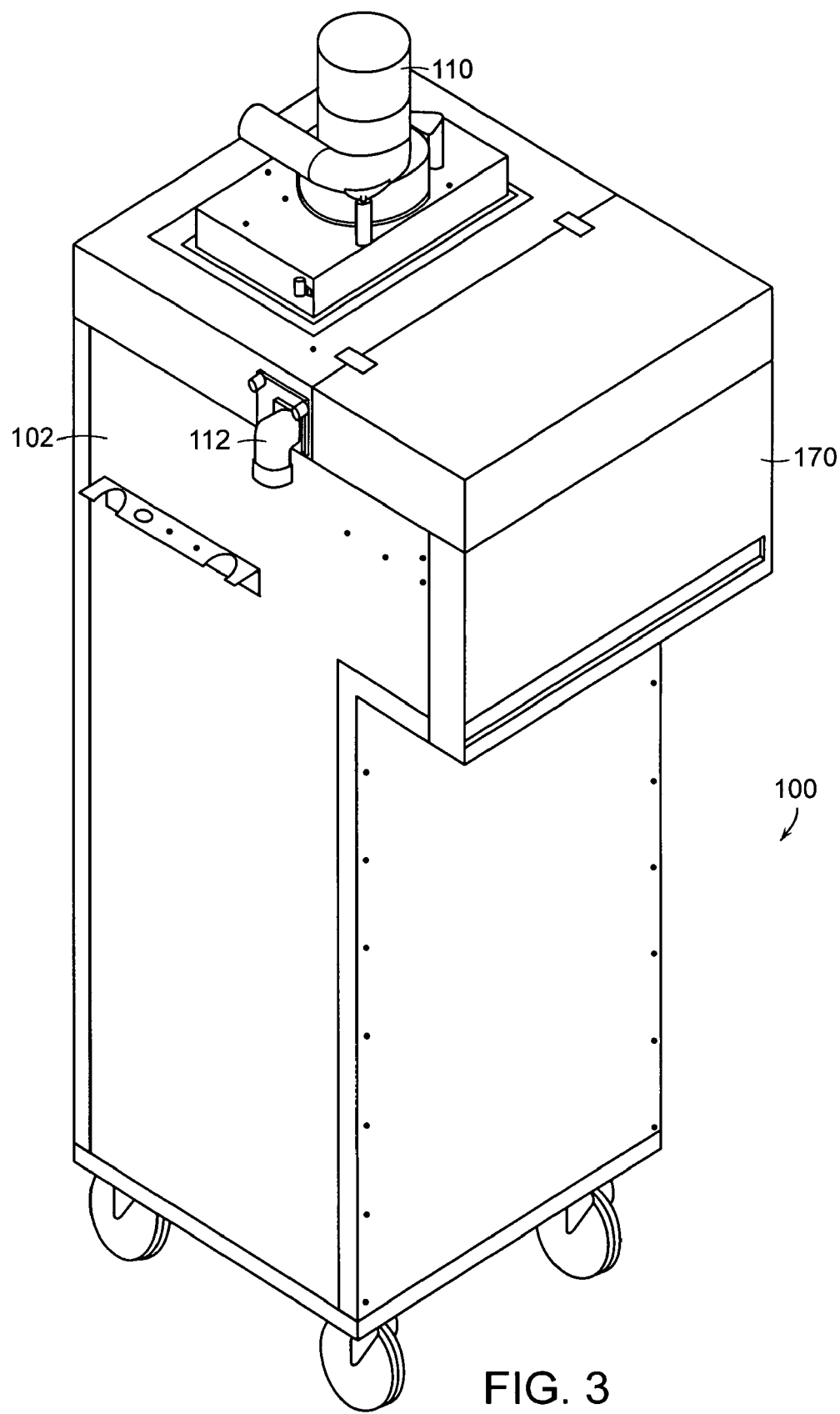
FIG. 3 is a perspective view of a particular powder feeder.

FIG. 3 is a perspective view of a particular powder feeder. The powder feeder 100 includes a vacuum subsystem 110 with an associated vacuum inlet 112, a feed reservoir 102 storing a supply of the powdered build material 39 (FIG. 1), and a metering system 170, which delivers powdered build material to the printer unit 200 in measured quantities. The following paragraphs describe in detail the design and operation of the powder feeder 100 and its subassemblies.

Vacuum System

Loading powder can be a messy process that can cause some of the powder to become airborne and allow the powder to deposit on the printer, the user, and the surrounding environment. Similar problems exist with recycling powder that has not been printed upon. There are two types of recyclable powder: 1) powder that was deposited in the build chamber but that was not used to form a part; and 2) excess powder used for the spreading process in order to ensure a complete layer is deposited; this excess powder ultimately drops into the overflow chamber. Both types of powder have the same difficulties in being recycled.

Figure 4:
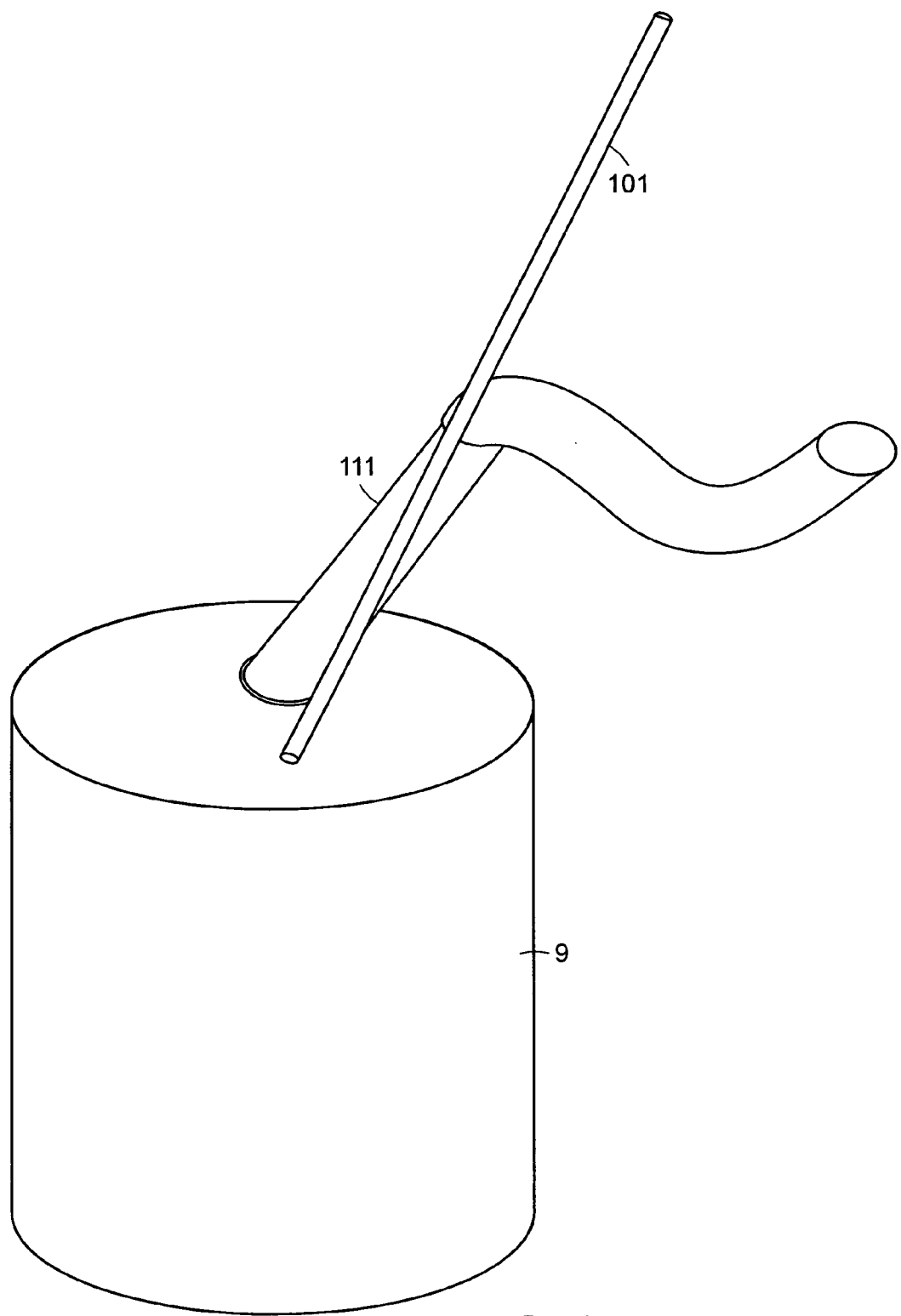
FIG. 4 is a perspective view of a powder loading subsystem.

FIG. 4 is a perspective view of a powder loading subsystem. The subsystem loads the feed reservoir 102 with the powdered build material 39. As in FIG. 3, a vacuum system 110 is attached to the feed reservoir 102 (other embodiments could include a detached vacuum). The vacuum system 110 forms the top of the powder feeder 100. The feed reservoir 102 is filled by drawing powdered build material from a shipping container 9 into the feed reservoir through a vacuum hose 111 coupled to the vacuum inlet 112. This allows the user to fill the reservoir without contacting the powder.

Air can also be injected into the container 9 (which could be the container in which the powder is shipped from its place of manufacture) through a compressed air hose 101. The compressed air aids in vacuuming the powder out of the container by making the powder flow more easily. This technique can be automated so that the feed reservoir 102 maintains a store of a sufficient quantity of build material.

A vacuum system having an outlet that empties into the feed reservoir of the 3-D printer, solves a variety of problems. By making the process cleaner, user satisfaction is increased and the machine is made more reliable because less airborne powder, which can contaminate machine components (e.g., bearing and electronics), is generated. By making the process more convenient (less time and interaction is required by the user) user satisfaction and productivity are increased.

Once a physical model has been formed by the 3-D printing process, it is necessary to separate the model from the unprinted powder (described below). It is also desirable to reuse the unprinted powder. To those ends, the vacuum system 110 can be used to remove most of the powder from the printed model 3 (FIG. 1).

Further, when the user has removed the model 3 from the printer, the user can use the vacuum system 110 to transport into the feed reservoir 102 the remainder of the powder in the build chamber and any powder than has been deposited (by accident or design) elsewhere on the printer. In particular, in the process of printing a physical model, the 3-D printer 200 spreads successive layers of powdered build material in the manner disclosed in U.S. Pat. No. 5,902,441 to Bredt, et al., depositing a quantity averaging approximately 20% of total amount spread into an overflow chamber. Another specific use for the vacuum system 110 is to return the powdered build material deposited in the overflow chamber to the feed reservoir 102.

Figure 5:
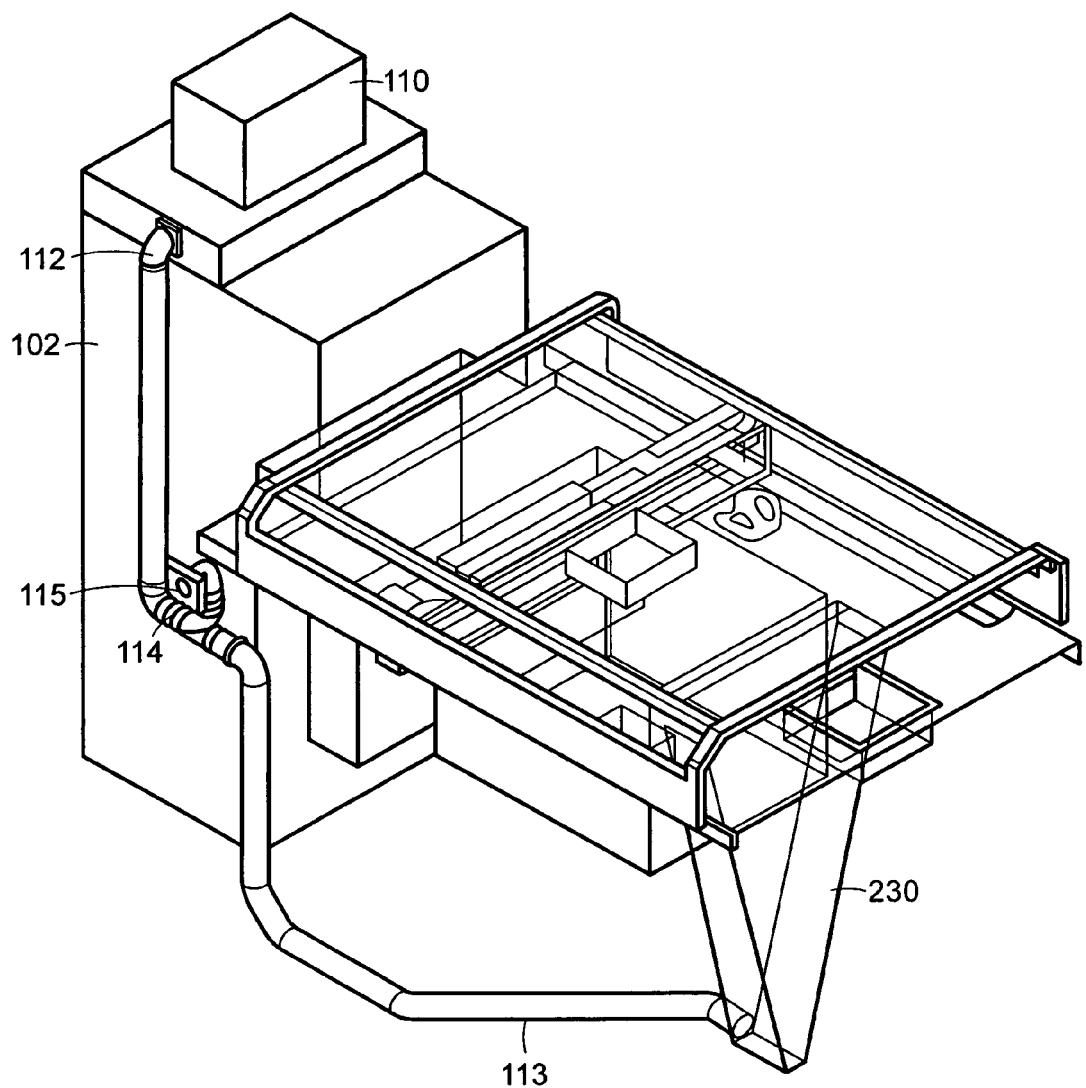
FIG. 5 is a schematic of the 3-D printer assembly of FIG. 2 with several parts removed to reveal the overflow chamber.

FIG. 5 is a schematic of the 3-D printer assembly of FIG. 2 with several parts removed to reveal the overflow chamber 230. In the particular embodiment shown in FIG. 5, the overflow chamber 230 is connected through plumbing 113 and a valve 114 to the vacuum inlet 112. When the vacuum system 110 is activated, powdered build material from the overflow chamber 230 is drawn into the plumbing 113 and thence into the feed reservoir 102. An opening 115 is provided at the valve 114 to permit a vacuum hose to be attached for performing the filling and cleaning functions described above. To use a vacuum hose connected to the opening 115, the valve 114 is set to block the connection through the plumbing 113 to the overflow chamber 230 and open the connection to the opening 115.

Figure 6:
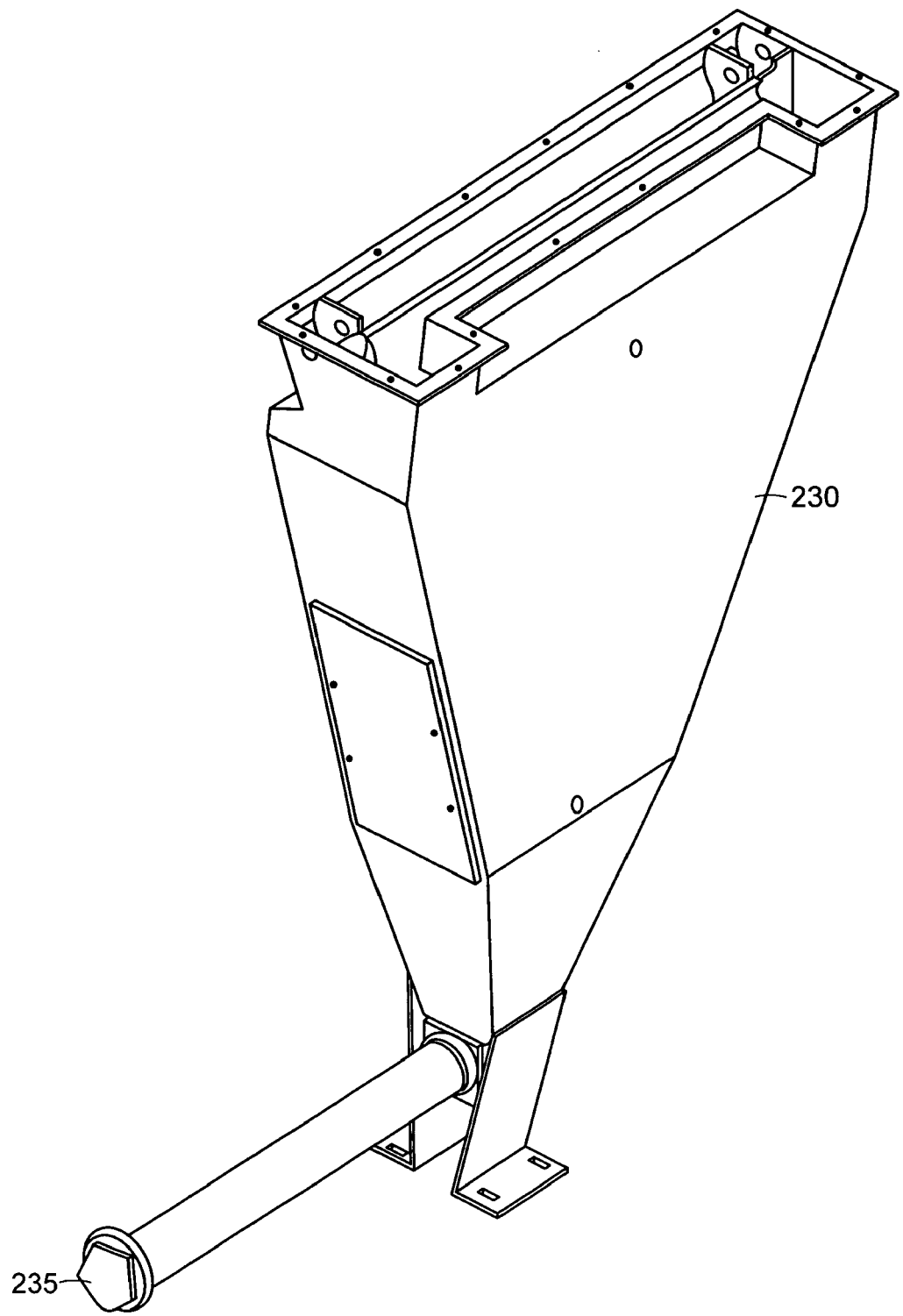
FIG. 6 is a schematic of another embodiment of the overflow chamber of FIG. 5.

FIG. 6 is a schematic of another embodiment of the overflow chamber of FIG. 5. As shown, the overflow chamber 230 has an overflow chamber outlet 235 permanently attached at its lower end. To empty the overflow chamber 230, the user attaches a vacuum hose at one end to the overflow chamber outlet 235 and at the other end to the vacuum inlet 112 of the vacuum system 110 (FIG. 3). The vacuum system 110 is then activated, and powdered build material is transported from the overflow chamber 230 to the feed reservoir 102.

If the inlet 112 of the vacuum system 110 is connected directly to the feed reservoir 102, foreign matter may enter the feed reservoir. If the foreign matter is similar in particle size to the powdered build material (e.g., dust) the foreign matter may have no detectable effect on the 3-D printer or the 3-D printing process. If large particles or chunks enter the feed reservoir, however, these chunks may damage the mechanism or, if they pass through the feed reservoir and are deposited in the build chamber, they may damage the physical model being printed.

Figure 7:
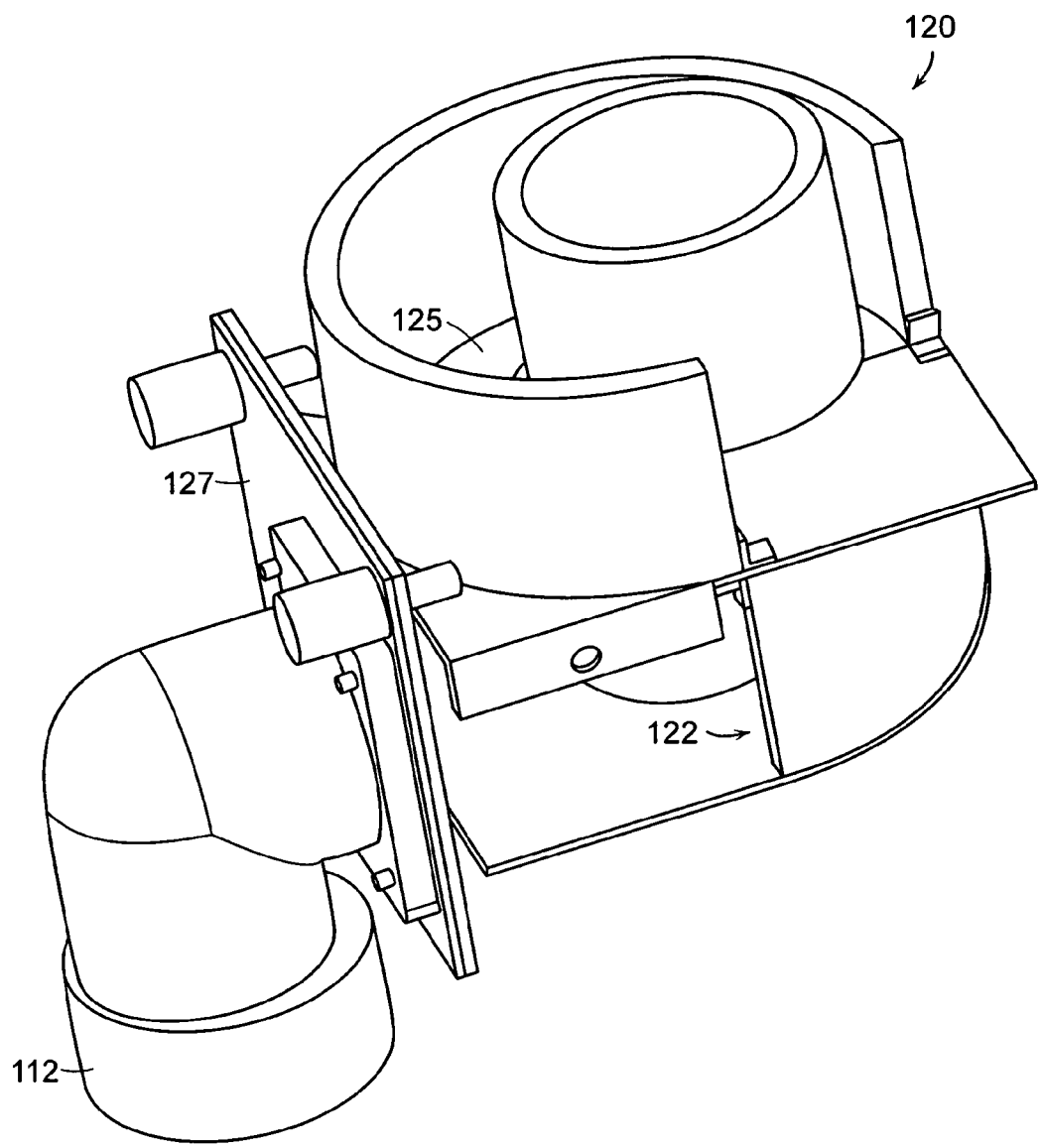
FIG. 7 is a schematic of a chunk separator.

FIG. 7 is a schematic of a chunk separator. As shown, the chunk separator 120 is placed between the vacuum system inlet 112 and the feed reservoir 102. The separator 120 causes air, powdered build material and any entrained foreign matter that enters the inlet 112 to follow a generally circular airflow path 122 around the inside of the device. The powdered build material and air pass upward through the separator screen 125, leaving the separator 120, and entering the feed reservoir 102. Any entrained foreign matter in the airflow 122 that is too large to pass through the screen 125 continues to circulate around the interior of the device. This recirculation action tends to fracture and abrade any chunks of foreign matter, allowing some part of them eventually to pass through the screen 125. A faceplate 127 of the separator 120 is removable to provide an access port for removal of accumulated debris.

Figure 8:
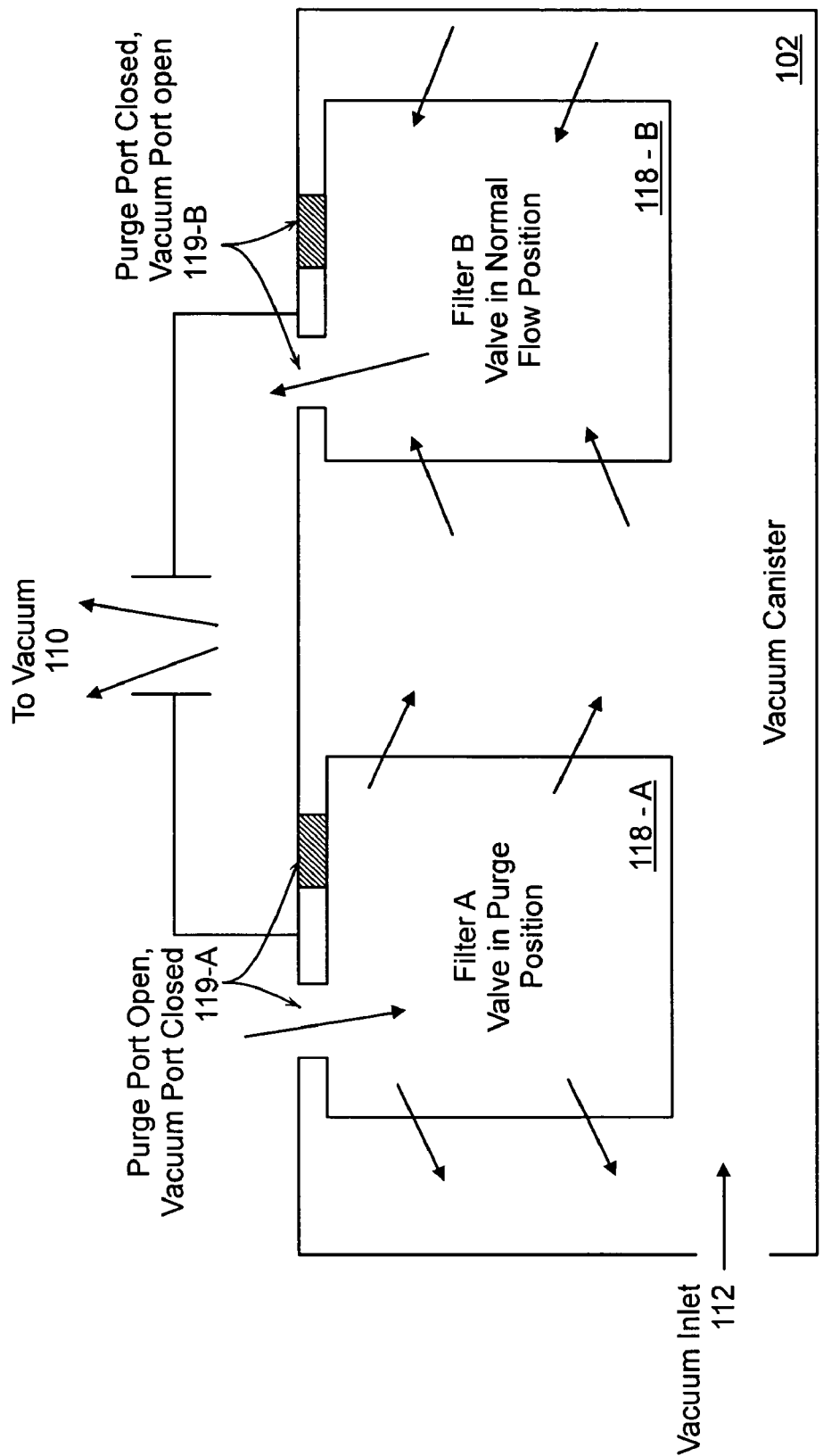
FIG. 8 is a schematic of a filter system for the vacuum system of FIG. 3.

FIG. 8 is a schematic of a filter system for the vacuum system of FIG. 3. As shown, the vacuum system 110 includes two filters 118-A, 118-B located inside the feed reservoir 102 to prevent fine particles (such as the powdered build material) that are picked up by the vacuum system 110 from being exhausted to the room. One skilled in the art will recognize that the filters will become coated with powdered build material, and that this coating will reduce the airflow through the filter, reducing the pressure differential generated at the vacuum inlet 112. The filter system is used to clean the filters.

A system of valves 119-A, 119B closes the vacuum source to a single filter outlet and diverts air at or near atmospheric pressure into the same outlet, reversing the flow direction and blowing off accumulated powder, which then falls into the feed reservoir 102. The other filter in the system maintains airflow and vacuum inside the feed reservoir 102 to induce this airflow. This purging cycle is periodically sequenced through each filter element. In this manner the filters can be cleaned without intervention by the user and without requiring the user to stop using the vacuum system while the filters are automatically cleaned.

Powder Feeding

The principal function of powder feeder 100 is to deliver powdered build material to the 3-D printer unit 200 in measured quantities as required by the printing process.

Figure 9:
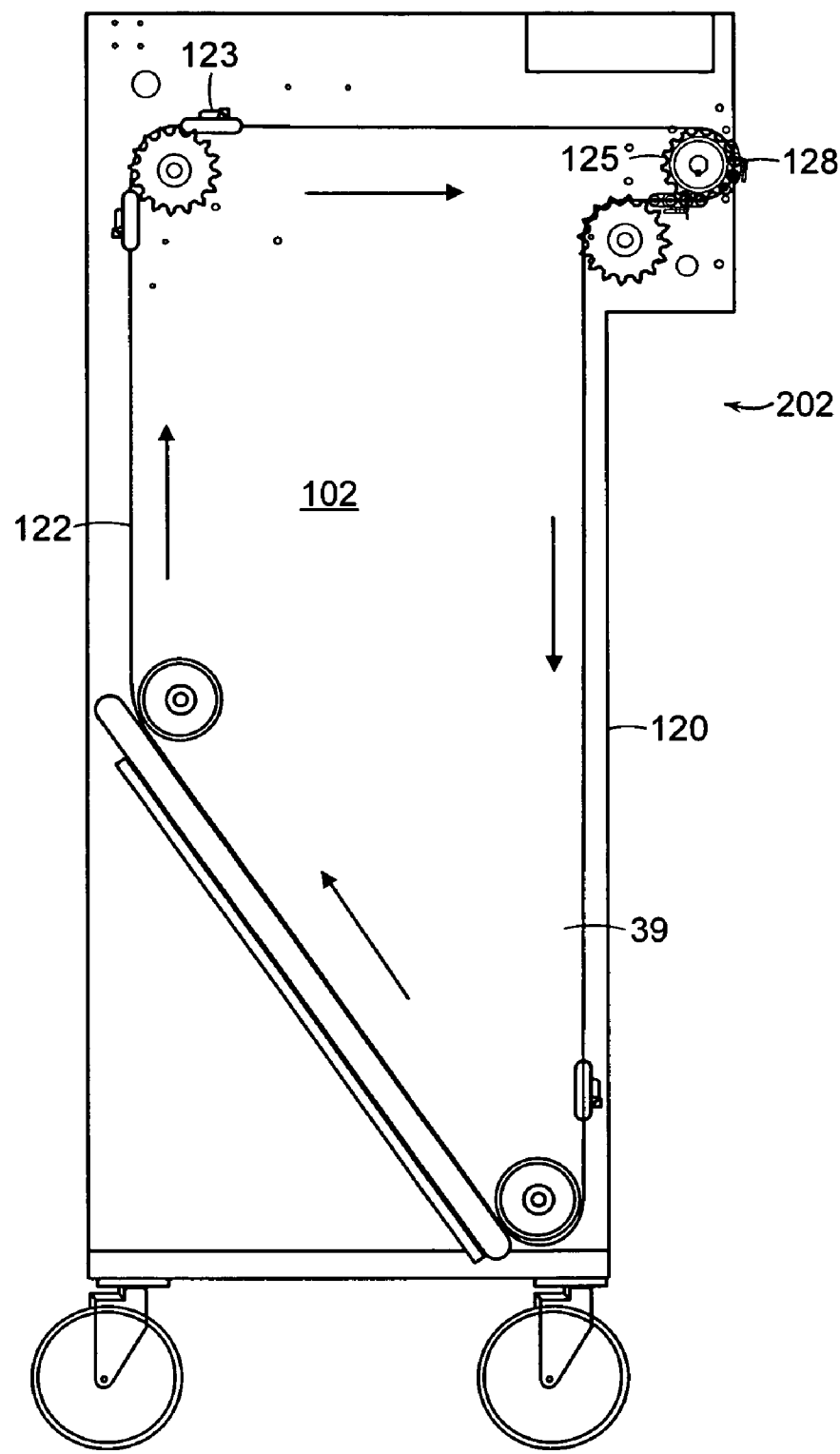
FIG. 9 is a schematic of a powder delivery mechanism.

FIG. 9 is a schematic of a powder delivery mechanism. The feed reservoir 102 has, in particular, volumetric capacity of approximately 8.6 ft³, or enough powdered build material to print 1.75 of the largest physical models possible within the constraints of the printer unit 200. The powder delivery mechanism 120 includes a conveyor 122 having slats 123 attached to two strands of conveyor chain. The conveyor is driven by an electric motor and moves in recirculating fashion in the direction indicated by the arrows. The slats 123 pass through the powdered build material 39 in the feed reservoir 102, and each slat 123 carries some of the powdered build material 39 to a point above the plane of the build surface 202. As the slats 123 pass over a drive sprocket 125 they are inverted at drop point 128, and the powdered build material is dumped onto the build surface 202 in position to be spread over the surface of the physical model being printed.

Figure 10:
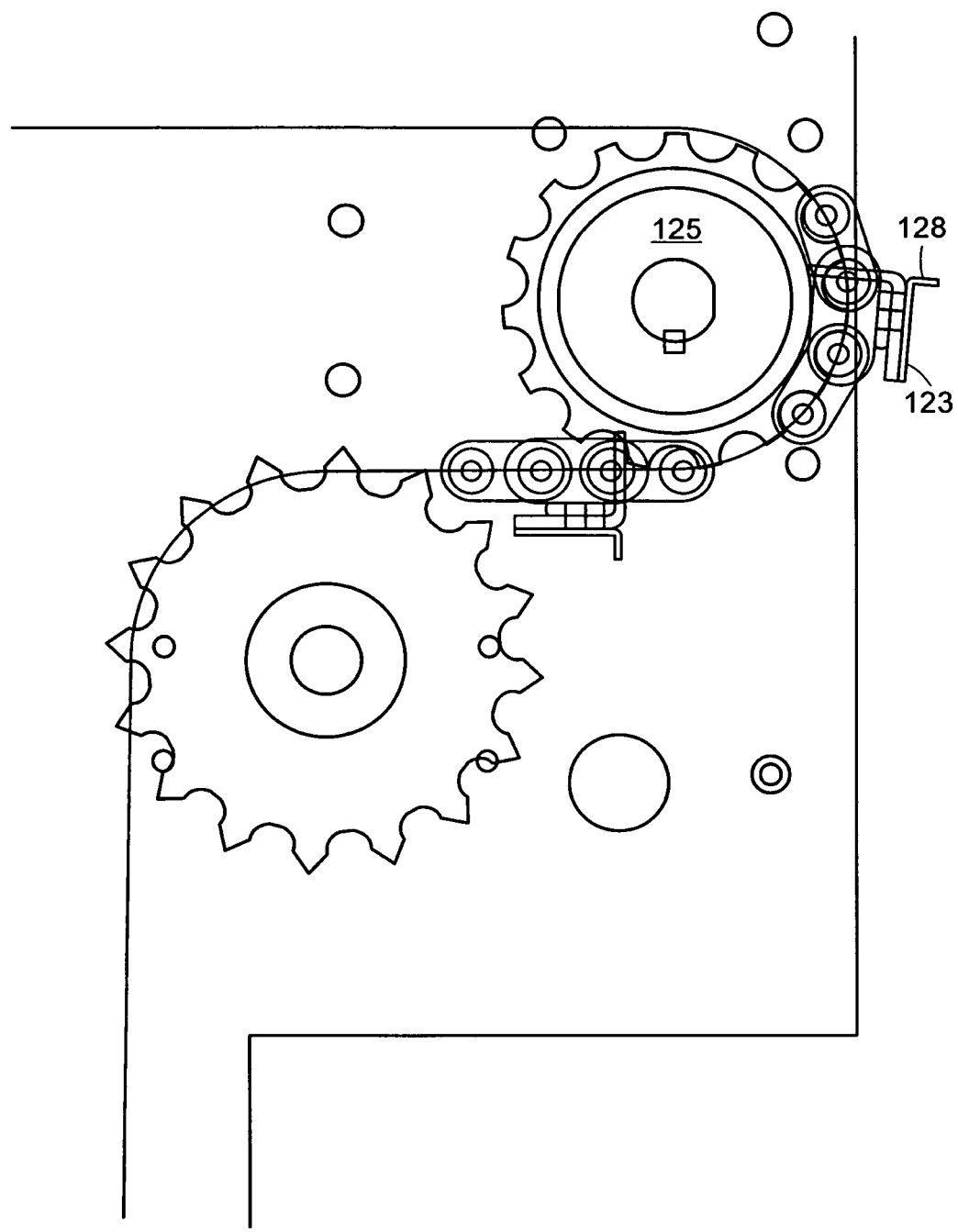
FIG. 10 is a more detailed view of a slat 123 at the drop point 128.

FIG. 10 is a more detailed view of a slat 123 at the drop point 128.

The system shown in FIG. 9 has the added advantage that the slats are constantly moving along the periphery of the feed reservoir 102. In so doing, the motion of the slats 123 stirs the volume of powder and prevents bridges and areas of stagnant powder from being formed. It is desirable to avoid stagnant areas because the powder in these areas cannot be extracted from the feed reservoir by the conveyor system 122. Such stagnant areas represent powder that is wasted because it cannot be used during the normal operation of the feed conveyor.

For a reservoir with a large amount of powder, the force on the slats 123 being dragged through the reservoir by the conveyor 122 may be very large. The slat geometry can be altered to stiffen them sufficiently to allow them to travel through the powdered build material without permanently deforming.

Figure 11:
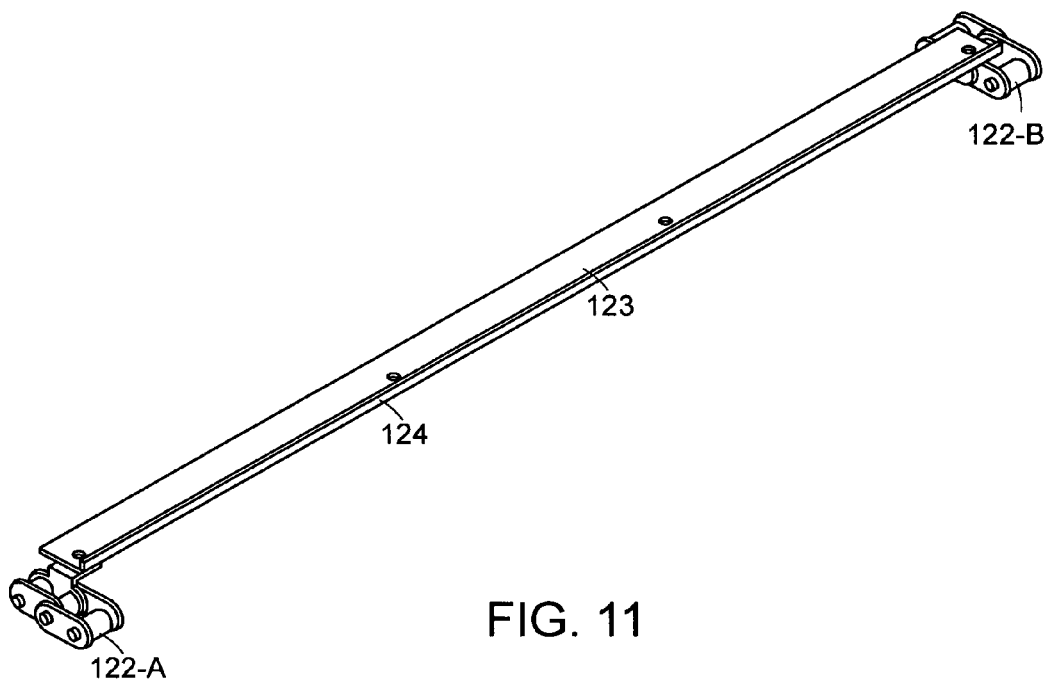
FIG. 11 is a perspective view of an embodiment of a simple slat.

FIG. 11 is a perspective view of an embodiment of a simple slat. The slat 123 includes a leg 124 and is connected to the two conveyor chains 122-A, 122-B. This slat delivers an optimum volume of powdered build material but may be too weak to withstand the loads placed upon it. The leg can be strengthened for greater stiffness.

Figure 12:
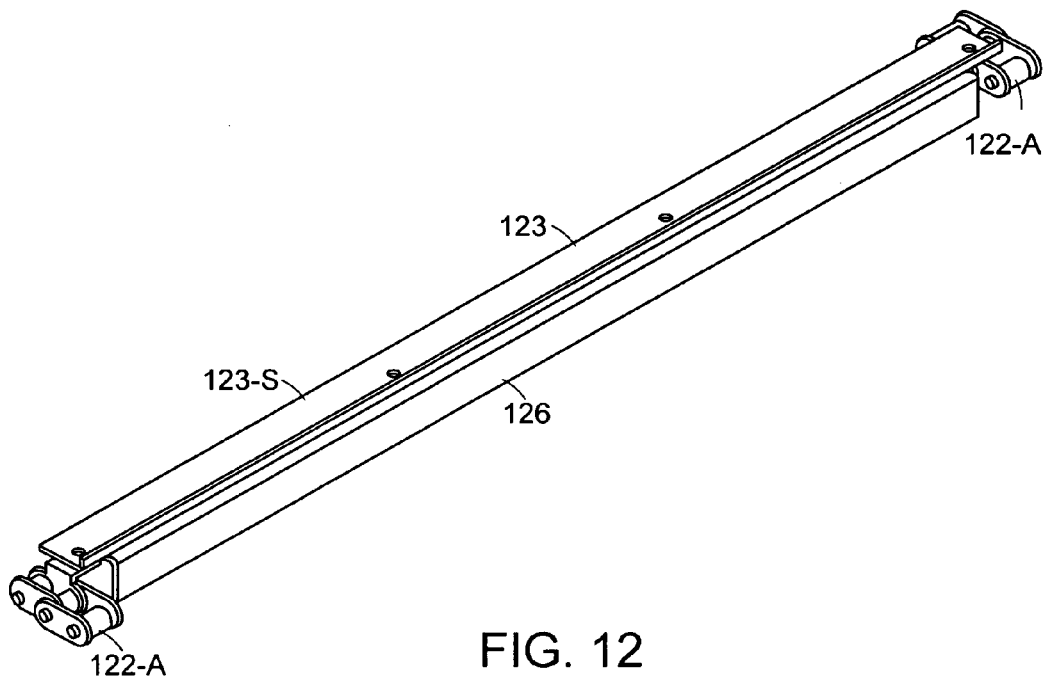
FIG. 12 is a perspective view of a particular embodiment of a reinforced slat.

FIG. 12 is a perspective view of a particular embodiment of a reinforced slat. The same slat 123 includes an additional stiffening member 126 that adds to the strength of the member without increasing the amount of powdered build material it delivers. The powder is carried on the surface 123-S of the slat 123. This configuration has an additional advantage that the moment created by the resistance of the powder wraps the chain 122-A, 122-B onto its pulleys or sprockets. A moment in the opposite direction tends to cause the chain to jam rather than going around the pulley or sprocket.

Powder Metering

Figure 13:
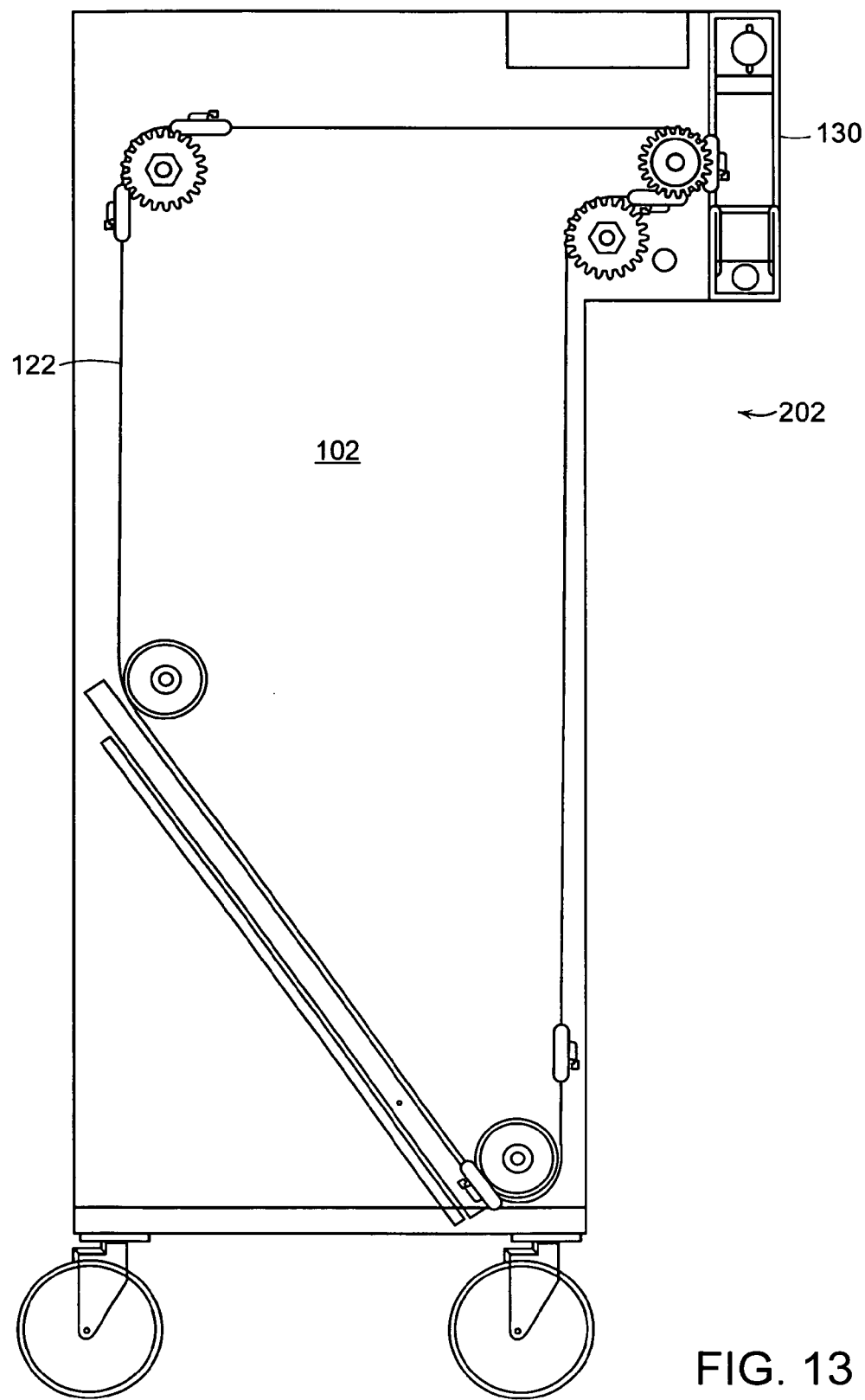
FIG. 13 is a schematic of a conveyor system of FIG. 9 that delivers powdered build material to a separate metering system.

FIG. 13 schematic of a conveyor system of FIG. 9 that delivers powdered build material to a separate metering system. The metering system 130 regulates the flow of powdered build material into the 3-D printer.

Figure 14A:
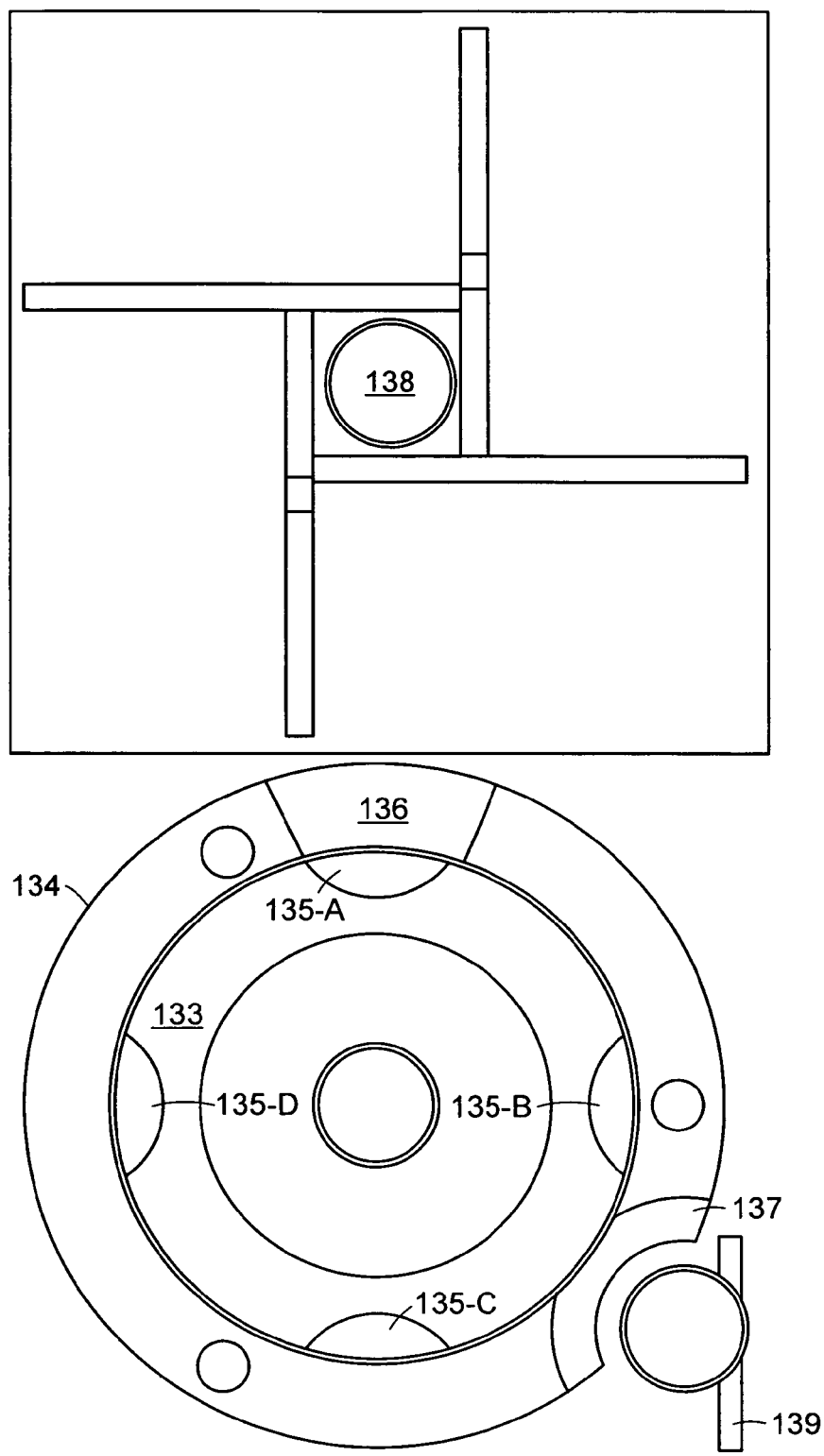
FIGS. 14A–14B are schematics of the metering system of FIG. 13.
Figure 14B:
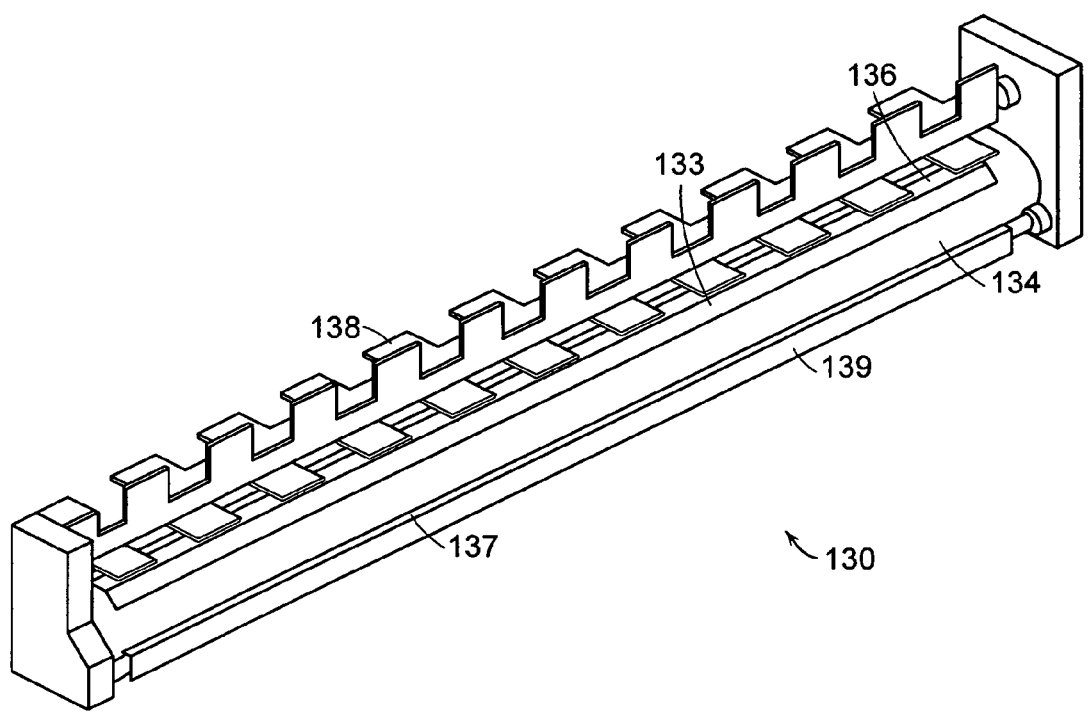

FIGS. 14A–14B are schematics of the metering system of FIG. 13. Referring to FIG. 14A, a cylindrical metering roller 133 is enclosed by a closely fitting tube 134. The metering roller 133 has four axial grooves in its surface, which constitute metering cavities 135-A, 135-B, 135-C, and 135-D. The tube 134 has an entrance slot 136 and an exit slot 137. As the metering roller 133 rotates inside the tube 134, powdered build material enters a metering cavities 135-A through the entrance slot 136. As the metering roller 133 continues to rotate, powdered build material is captured between the metering roller 133 and the tube 134 and is carried around to the exit slot 137, where it is discharged onto the build surface 202 (FIG. 13).

The clearance between the metering roller 133 and the tube 134 is approximately 0.015 in., which has been determined to be large enough to allow the metering roller 133 to rotate freely but small enough to prevent unwanted radial powder flow between the inlet slot 136 and the outlet slot 137. The metering cavities 135 each hold approximately 3 in$^3$ of powdered build material, which is equal to the material required for the smallest desirable increment of layer thickness. This allows an amount of powdered build material consistent with any desired layer thickness be delivered by causing the metering roller 133 to rotate until the appropriate number of metering cavities 135 have picked up and delivered powdered build material.

Also shown is a paddle wheel agitator 138, which disturbs the powdered build material above the metering roller 133 to break bridges and keep the powdered build material flowing into the metering cavities 135.

A flicker blade 139 rotates in the opposite direction from the metering roller 133. When a metering cavity 135 containing powdered build material enters the exit slot 137, the flicker blade 139 wipes the powdered build material out of the metering cavity 135. This technique prevents variation in the amount of powdered build material delivered, even when the materials are sticky or have a tendency to bridge.

Figure 15:
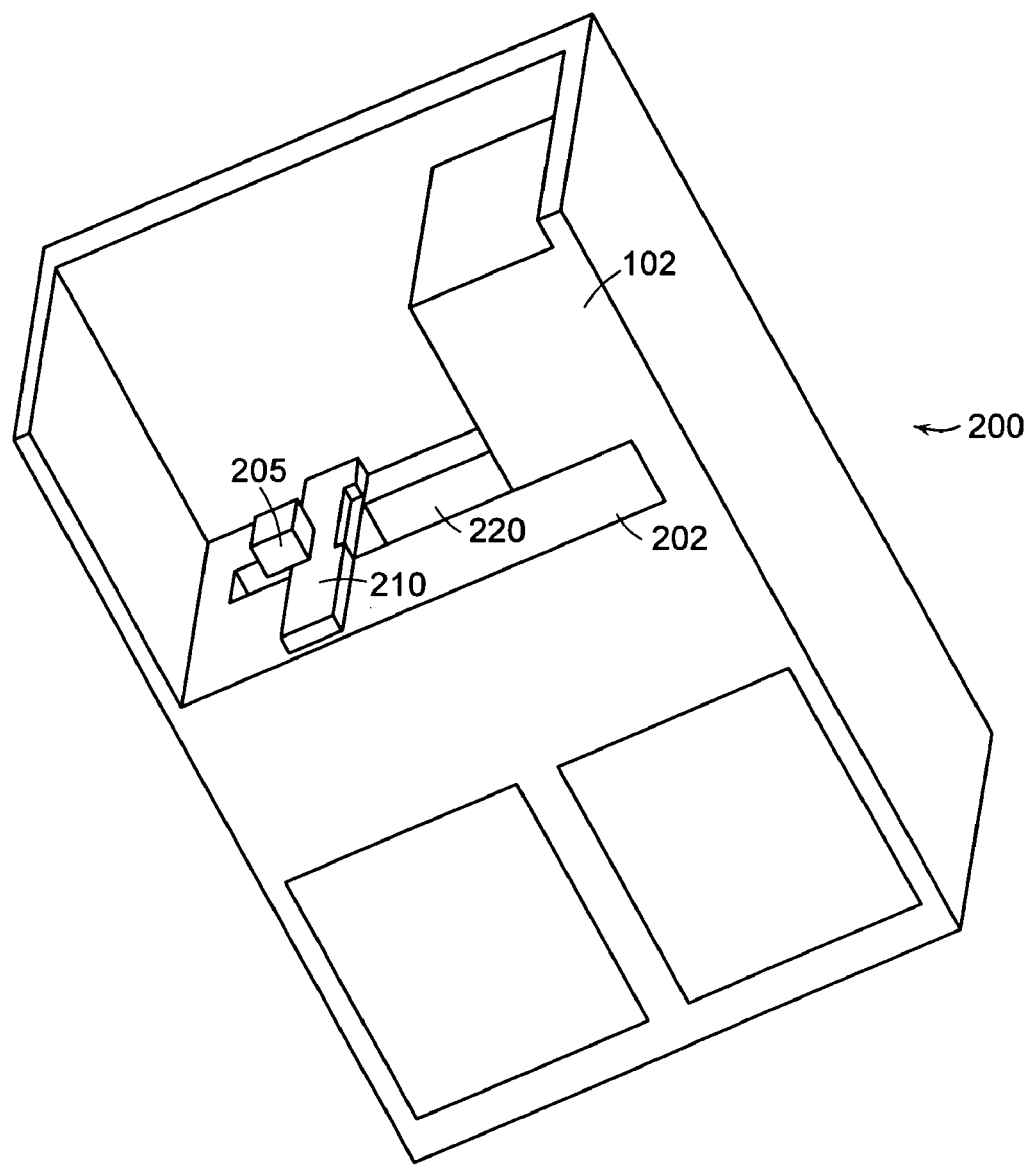
FIG. 15 is a schematic of an embodiment in which the feed reservoir 102 is entirely above the plane of the build surface 202 and integrated into a printer unit 200.

FIG. 15 is a schematic of an embodiment in which the feed reservoir 102 is entirely above the plane of the build surface 202 and integrated into a printer unit 200'. Powder is metered out of the feed reservoir 102 onto the plane of the build surface 202 and spread over a build box 220 by the gantry 210. The powder is then printed on by a printhead or printhead array 205. In this embodiment the metering system could be located at the bottom of the feed reservoir and fed by gravity. In other embodiments, the metering system could be located at the bottom of the feed reservoir and the reservoir would include paddlewheel or vibratory mechanisms to ensure the flow of the powder into the metering system if the powder is a type prone to clumping or bridging.

Although the powder can be delivered to one side of the build chamber and then spread across the build chamber by a roller, the feed reservoir can be mounted to the gantry 210, which is capable of moving across the build chamber. Powder could be continuously metered out of the feed reservoir and deposited directly onto the build chamber 220 as the gantry is moved across. In one such embodiment, a roller or doctor blade could be used to smooth and level the surface after the feed reservoir passed over.

Printhead

Printhead Cleaning

The 3-D printer unit 200 uses an array of inkjet printheads to selectively dispense a binder material onto successive layers of powdered build material, selectively hardening the build material and forming 3-D physical models. This technology is disclosed in detail in the incorporated patents, e.g., U.S. Pat. No. 5,902,441 to Bredt, et al. An aspect of a successful inkjet printing device is a technique for keeping the face of the printhead clean. Keeping the printheads clean in a 3-D printing environment is particularly demanding because of the high concentration of airborne powdered build material in the vicinity of the printhead face. In most inkjet printers, the printhead face is routinely wiped with a squeegee-like wiper element.

Figure 16B:
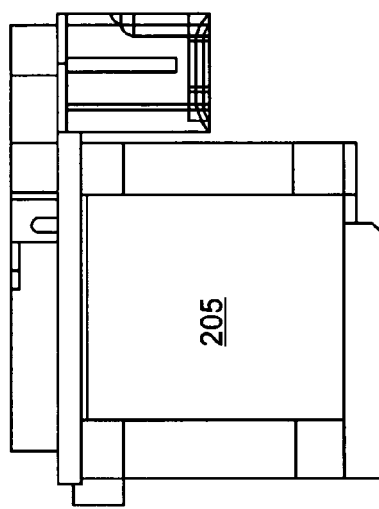
Figure 16B:
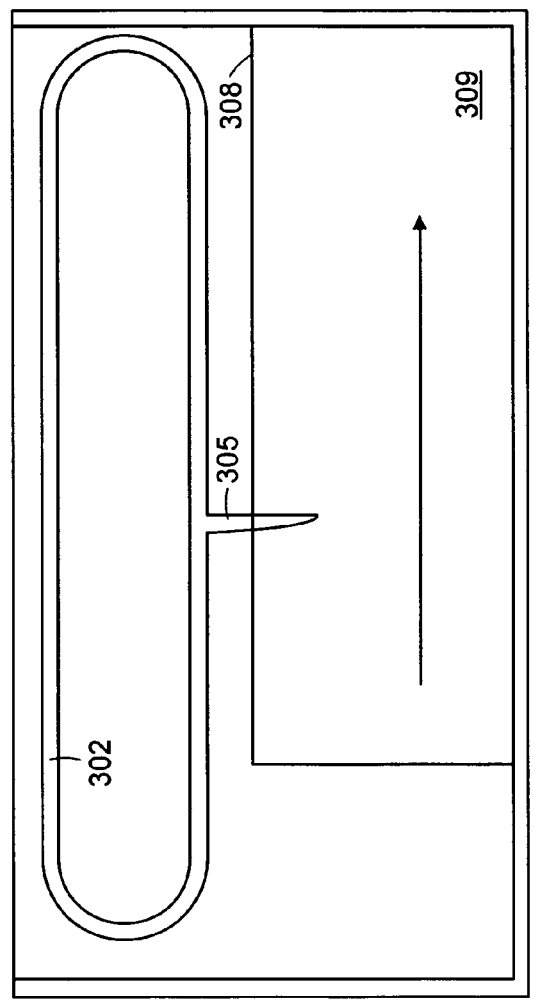

FIGS. 16A–16B are schematics of a particular cleaning station 300. As shown, a wiper element 305 is situated to wipe the face of a printhead 205 as the printhead translates over the wiper 305 in the left direction indicated by the arrow. As the printhead 205 passes over the wiper element 305, contaminating material is transferred from the face of the printhead 205 to the wiper element 305. This methods works well as long as contaminating material is not allowed to accumulate on the wiper element.

As shown, the wiper element 305 is mounted on a belt 302. The belt 302 runs on pulleys 304-A, 304-B, which are rotatable by a motor 306. The wiper element 305 is stationary in position to wipe the face of the printhead 205. As shown in FIG. 16B, the motor 306 has been activated, causing the wiper element 305 to be dragged over the cleaning surface 308 of a wiper block 309 in the direction indicated by the arrow, transferring any accumulated contamination to the wiper block 309. The wiper block 309 is routinely replaced to maintain a clean wiping surface.

Figure 17:
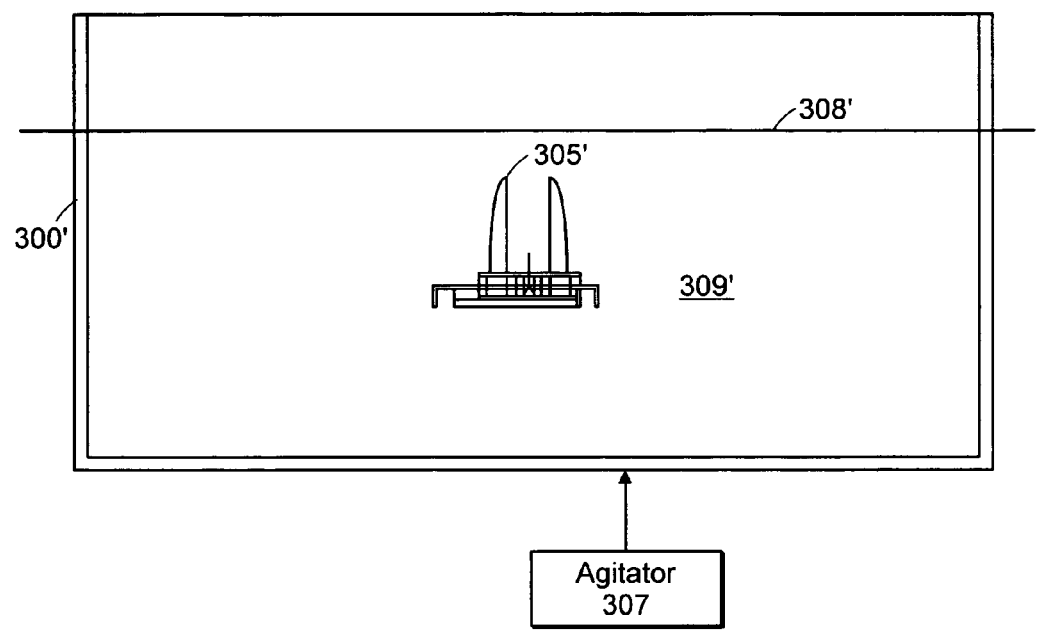
FIG. 17 is a schematic of another particular embodiment of a cleaning station.

FIG. 17 is a schematic of another particular embodiment of a cleaning station. In this cleaning station 300', a wiper element 305' can be retracted for cleaning into the depressed cleaning station 300', which is filled to a level 308' with a cleaning fluid 309'. When the wiper element 305' is retracted, it is fully immersed in the cleaning fluid 309'. An agitator 307 can agitate the fluid 309' by various means, such as ultrasonic vibration, rapid circulation of the cleaning fluid, or injection of air bubbles.

Printhead Failure Detection

The service life of a printhead varies depending on use and other variables that may not be controlled. Sometimes printheads fail partially, with some jets not firing while others continue to fire normally. At other times an entire printhead fails, with all of its jets malfunctioning. Because there is a large variation in how printheads fail and in the overall life of a printhead and because the failure of a printhead can cause the failure of the 3-D printer to produce the desired physical model it is useful to be able to detect the condition of a printhead and to be able to determine whether some, most or all of its jets are firing.

Figure 18:
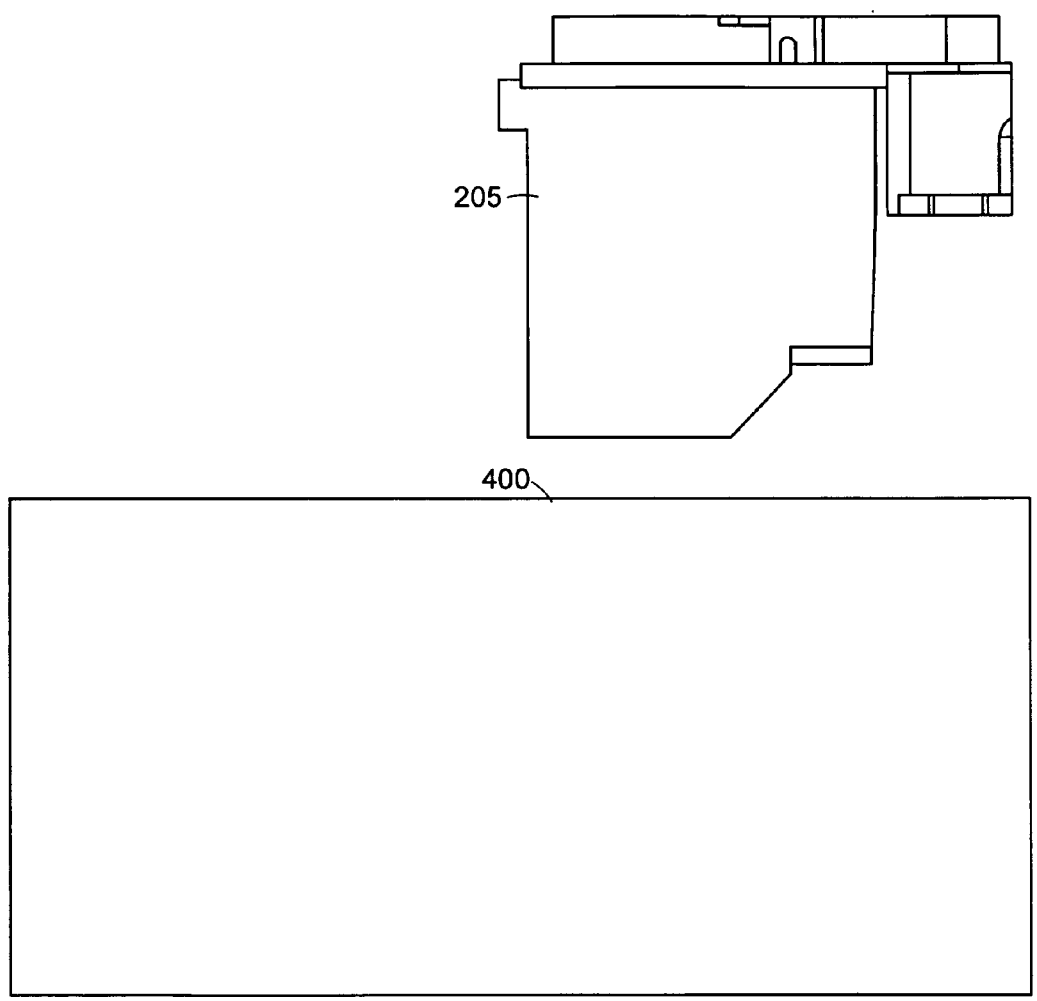
FIG. 18 is a schematic of a drop detector for monitoring the condition of a printhead.

FIG. 18 is a schematic of a drop detector for monitoring the condition of a printhead. After the printhead 205 is moved into position above the drop detector 400, each jet of the printhead 205 is fired independently a number of times sufficient for the detector to positively detect whether the jet is firing normally. In an alternative embodiment, a group of jets is fired simultaneously, and the detector determines how many jets within each group are firing normally without determining which specific jets are malfunctioning. This method is quicker because several jets can be tested at once.

A particular drop detector 400 can work by optical means. For example, an emitter can emit a frequency of light to which the binder is opaque (infrared, for instance). That light beam is interrupted when a drop fired by the printhead passes through the beam. Failure to detect the interruption indicates a malfunctioning jet. If the detection beam were sufficiently narrow, miss-aimed jets can also be detected.

Another particular drop detector 400 works by detecting drop impacts on a membrane attached to a microphone or a piezo-electric detector.

Printhead Failure Compensation Strategies

Being able to detect whether each printhead is functioning properly allows the design of different modes of operation for the 3-D printer. In the simplest mode of operation the print job is interrupted as soon as a malfunction is detected. The user may have a brief period to replace the faulty printhead or else the job is aborted. Alternatively, the print job can be aborted in any case. This would save time and reduce the amount of powder consumed. Without a drop detector, if the printhead fails partially, or if one printhead in a printer with several printheads fails totally or partially, a large quantity of powder could be printed on even though the resulting part would not be useful. By aborting the print job when a defect is detected the user saves the expense of the binder and powder that would have been wasted if the defect were not detected.

In another mode of operation, if some jets are determined to be nonfunctioning but others are still functioning (as, for instance, if one printhead in a multi-printhead array fails), the printing process is changed so that more than one pass is made over each area of the part. By advancing the x-axis, 1/n of the normal distance for each pass of the printheads in the y-axis each area will be printed by n different jets. The volume of binder printed in each pass would be reduced to 1/n the normal amount. N can be selected so that the weak areas of the part (which are printed by n−1 functioning jets) are still strong enough to provide a satisfactory part.

In still another mode of operation, if a printhead at one end or the other of a multi-printhead array fails the width of the array is redefined (as having n−1 printheads where n is the normal complement of printheads) and the print job could be completed.

In a color 3-D printer having 4 or more printheads where at least one printhead is supplied with binder with a colorant of one of the primaries (cyan, magenta, and yellow) another mode of operation is possible. In particular, if the detector determines that one of the printheads has failed the job is completed in a monochrome mode (or, to improve speed, a mode which uses all colors except the color of the faulty printhead) using the overlapping print mode mentioned above. In this way the user can get a useful part but not a color part or, in the alternative case, a part that has color but is not colorized per the design.

Post Processing

Depowdering

Once a physical model has been printed and most of the unprinted powdered build material has been removed, for example by using the vacuum system 110 shown in FIG. 3, it is desirable to now remove the remainder of the unprinted powdered build material. Because of adhesion between the unprinted powdered build material and the printed physical model, it is usually not possible to remove all of the unprinted powdered build material by using the vacuum system 110 alone. The balance of the powdered build material can be brushed away, but this can be tedious or impossible for certain geometries and may damage a delicate physical model. A particular method for removing the loose powdered build material from a physical model is to blow it off with compressed air. However, this creates a number of problems by creating an airborne cloud of powdered build material.

Figure 19:
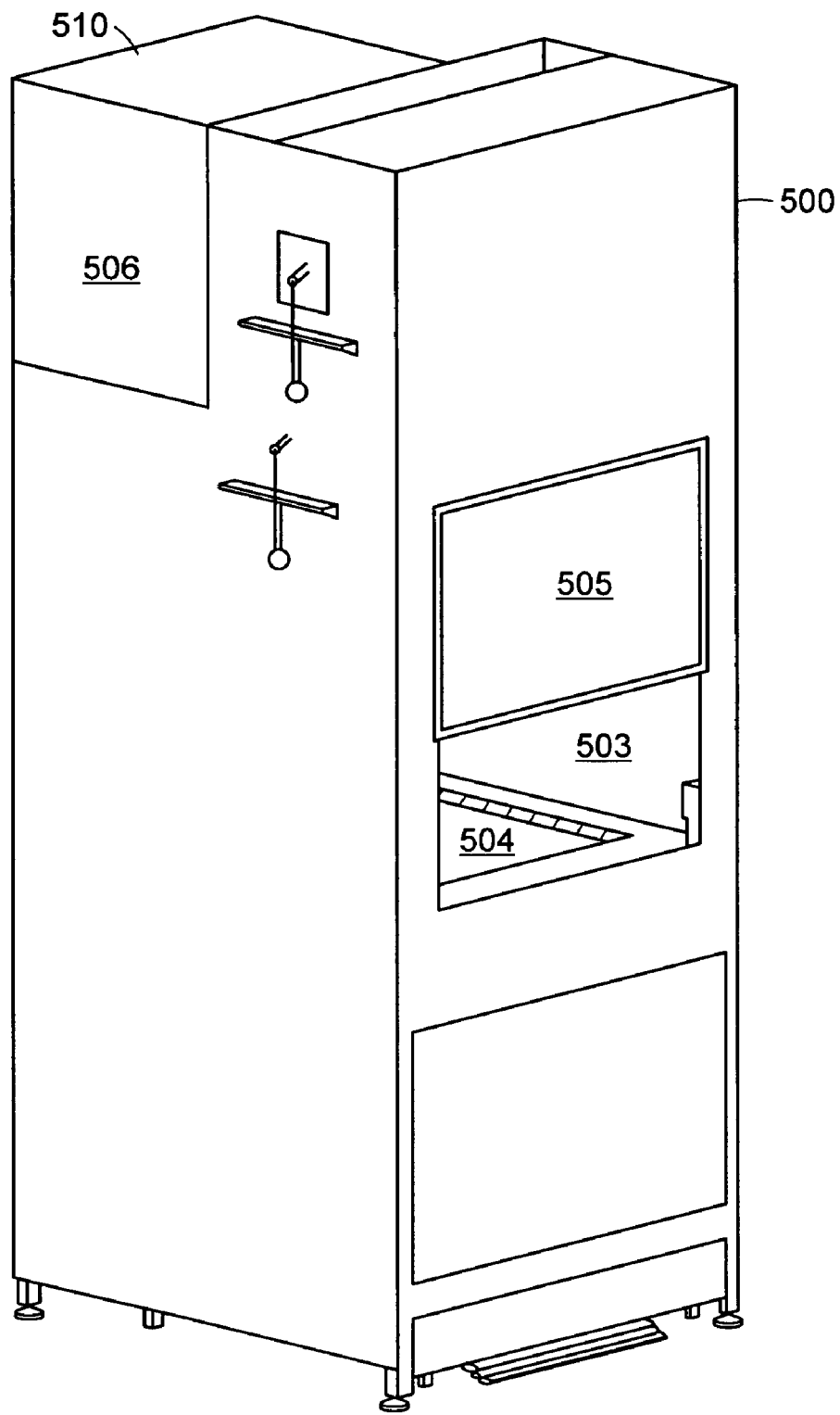
FIG. 19 is a schematic of a particular depowdering booth.

FIG. 19 is a schematic of a particular depowdering booth. A flow of air is created in the depowdering booth 500 to contain and direct the cloud of powdered build material created by a jet of compressed air directed at a physical model. An aperture 503 provides access to the interior of the depowdering booth 500. The physical model to be depowdered rests on a surface 504 inside of the aperture 503. A window 505, can be closed to help contain airborne powdered build material, and can be opened to allow a large physical model to be placed within the depowdering booth 500. A shroud 506 covers a blower 510 to attenuate the noise generated by operation of the equipment.

Figure 20:
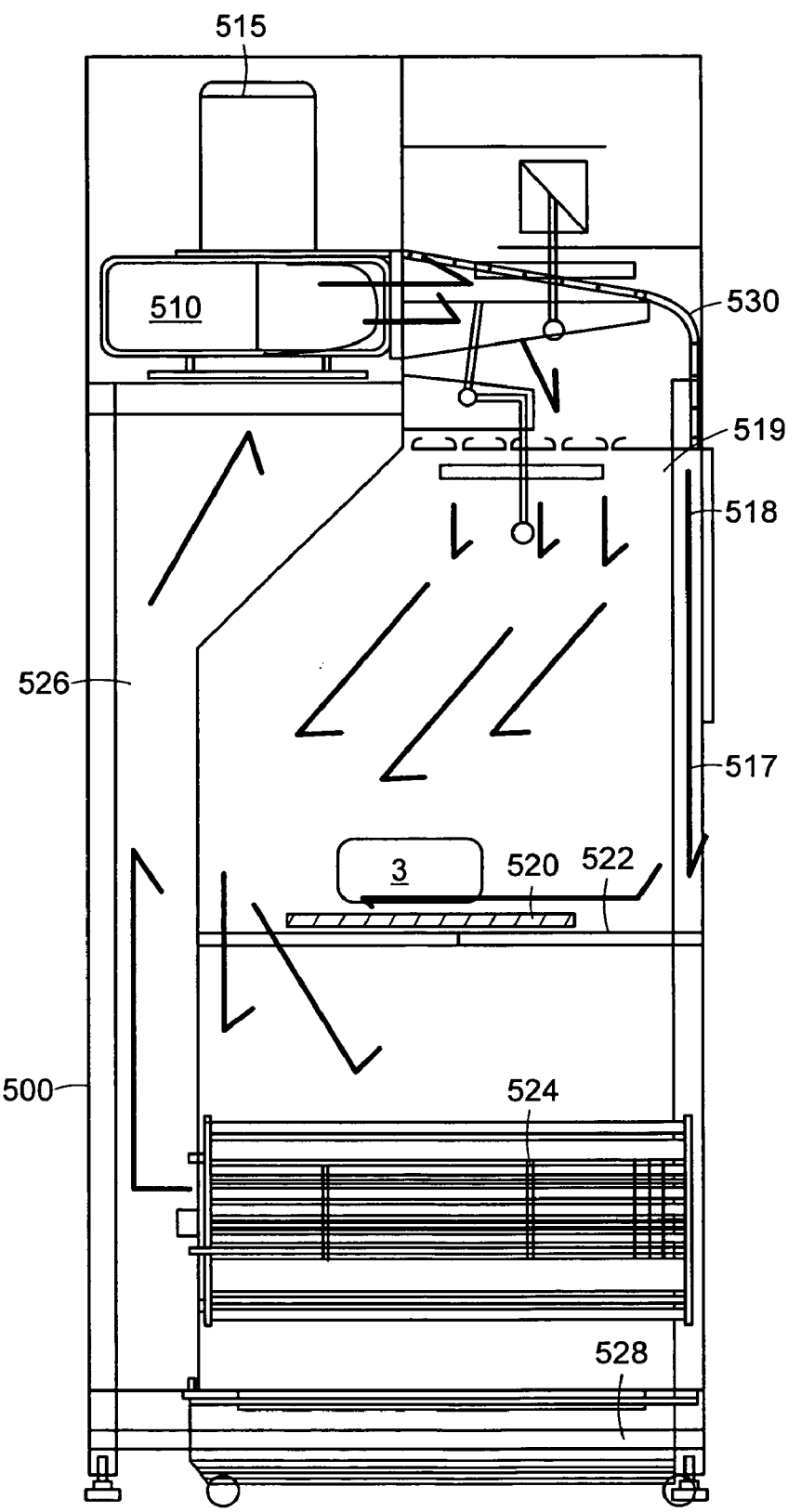
FIG. 20 is a schematic cutaway view of the depowdering booth of FIG. 19.

FIG. 20 is a schematic cutaway view of the depowdering booth of FIG. 18. Air is circulated through the depowdering booth 500 by the blower 510, which is powered by an electric motor 515. As indicated by arrows, air exits from the blower 510 into a diverter 530, where the flow is divided into two separate streams, a primary air curtain flow 517 carried by an air curtain duct 518, and a secondary powder clearing flow 519. Both flows recombine in the vicinity of the physical model 3 supported on a turntable 520, entraining powdered build material. The flow then passes through openings in a supporting surface 522 and through filters 524. Filtered air exits from the filters 524 into a clean air plenum 526 and thence enters the inlet of the blower 510 to complete its circuit.

As air carrying powdered build material passes through the filters 524, powdered build material collects on the surfaces of the filters 524, eventually restricting the airflow and reducing the efficiency of the system. To maintain the filters 524 in an unobstructed state, a pulse of air is periodically introduced into the interior of the filters 524 from the clean air plenum 526. This causes the flow of air through the filters 524 to reverse momentarily, forcing the accumulated powdered build material to separate from the surfaces of the filters 524 and to fall into a drawer 528. The powder collection drawer 528 can be removed to be emptied.

One objective is to prevent airborne powdered build material from escaping from the aperture 503 of the depowdering booth 500 (FIG. 19), thereby contaminating the surrounding environment. In particular, when a high-speed jet of compressed air is directed at the physical model 3, a substantial portion of the compressed air reflected from the physical model may be directed out of the depowdering booth 500 toward the user. To prevent the escape of this airborne powdered build material, the primary air curtain flow 517 (FIG. 20) is directed vertically down the face of the window 505 (FIG. 19), effectively capturing and deflecting the outwardly directed stream.

If all of the blower exhaust were channeled to flow along the face of the booth 500, a very effective air curtain could be created. In that case, however, most of the air in the booth would be stagnant and a region of slowly rotating air would be formed in the interior of the depowdering booth 500. When powdered build material is blown off the physical model 3, the slowly rotating air would quickly become opaque due to the powder particles suspended in it. This opaque powder cloud would be slow to dissipate, and would reduce the user's productivity. The secondary powder clearing flow 519, shown in FIG. 20, addresses this problem, creating a general downward flow throughout the booth so that none of the air is stagnant, and any powder cloud that develops will dissipate quickly.

The optimum balance between the primary air curtain flow 517 and the secondary air clearing flow 519 varies somewhat with the characteristics of the powdered build material being removed and with the geometry of the physical model being depowdered. For this reason, the diverter 530 is adjustable.

Figure 21:
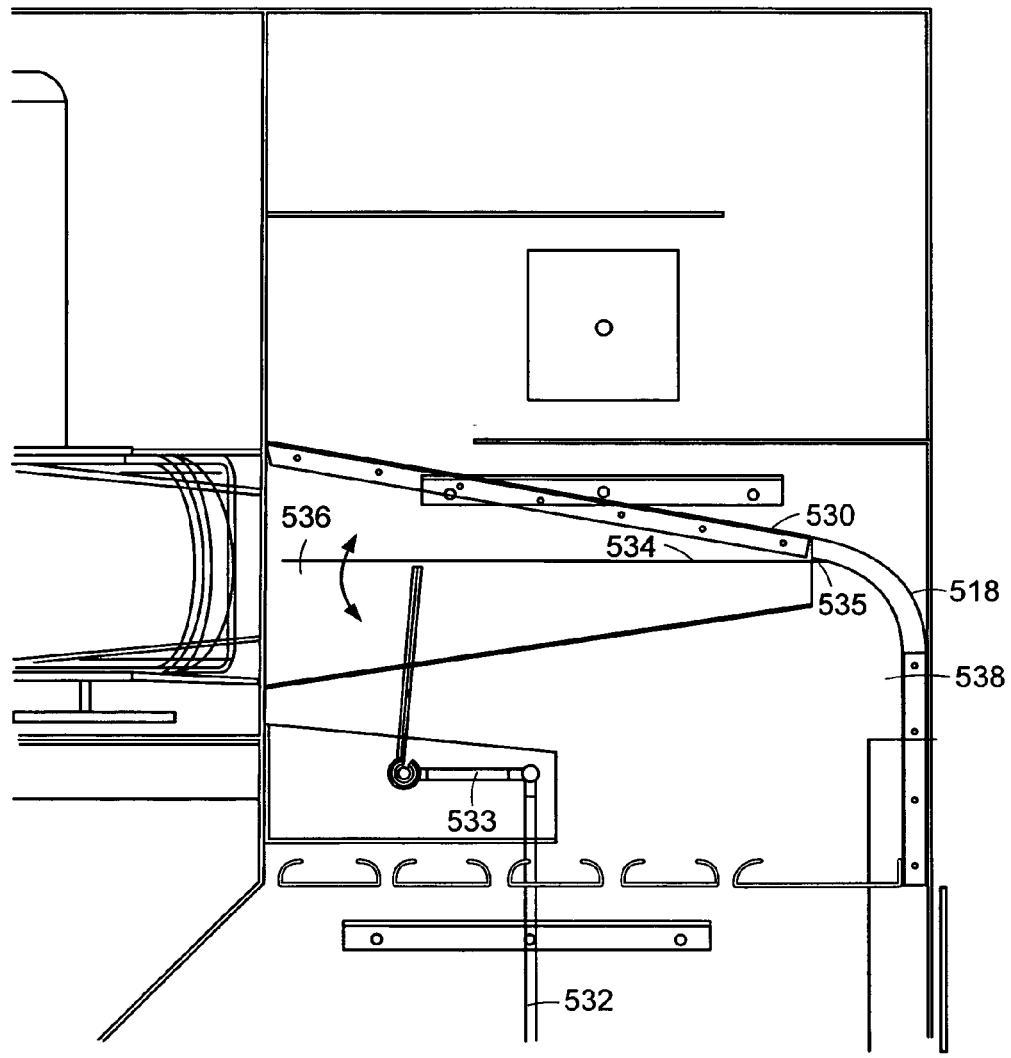
FIG. 21 is a schematic of a particular diverter of FIG. 20.

FIG. 21 is a schematic of a particular diverter of FIG. 20. Using a user operated lever 532, a mechanical linkage 533 causes a diverter vane 534 to rotate up and down as indicated by arrows around a pivot point 535. As the edge 536 of the diverter vane 534 moves downward, the primary air curtain flow 517 down the air curtain duct 518 assumes more of the total airflow. As the edge 536 of the diverter vane 534 moves upward, the secondary air cleaning flow 519 into the exhaust plenum 538 assumes more of the total airflow.

Figure 22:
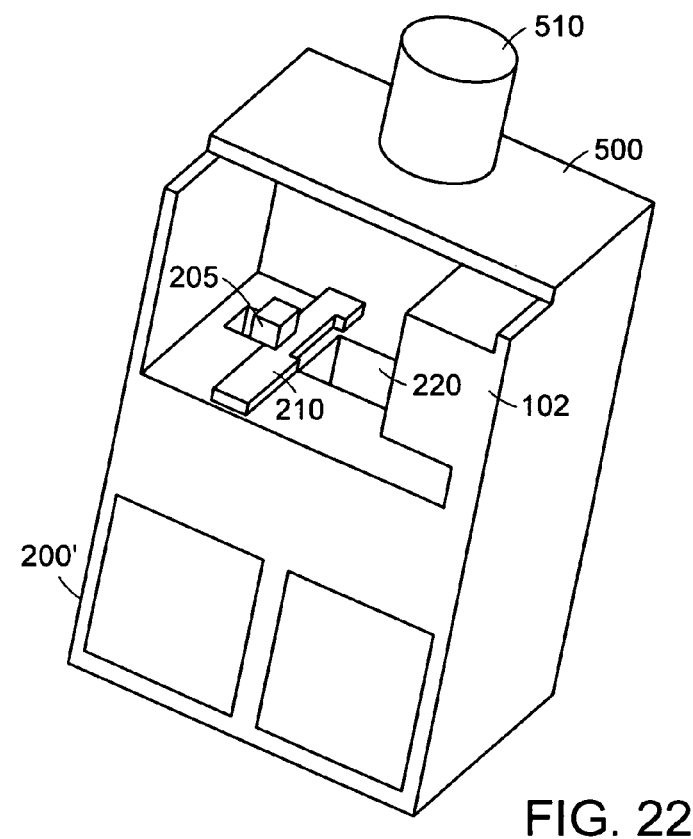
FIG. 22 is a schematic of a depowdering booth incorporated into the printer unit 200 of FIG. 15.

FIG. 22 is a schematic of a depowdering booth incorporated into the printer unit 200' of FIG. 15. As shown, a blower 510 is coupled to the depowdering booth 500. Air flows downward across the front opening of the booth 500, entrains powder, passes through filters (not shown) and is returned to the inlet of the blower 510. In this configuration, depowdering can be performed on the same equipment as printing If the depowdering booth 500 is separate from the printer unit 200', a cart can be used to transfer large or heavy physical models to the depowdering booth 500. Physical models are printed on a pallet, which is placed on the 3-D printer build table before printing begins. When printing is complete, the cart is positioned adjacent to the printer unit 200' and the gap between them is bridged by a set of transfer rails. These rails carry a multiplicity of rollers, which allow the pallet, carrying the printed physical model to slide smoothly onto the cart. The cart is then positioned adjacent to the depowdering booth 500, and transfer rails are used to slide the pallet, carrying the printed physical model into the depowdering booth 500.

Infiltration

The physical models created by the 3-D printing process are porous, making it possible to change their properties by infiltrating them with various resins. Resin can be applied to the physical model in many ways including immersion, brushing and pouring. Each of these methods is time consuming, wasteful of resin or both. The present invention applies resin to the physical model by a spraying process. Many of the infiltrants used on 3-D printed models are adhesives. Spraying adhesives creates a number of problems. First, it is necessary to contain any vapors created during the process (as for instance from overspray, or bounce back of atomized spray). If the vapors are not contained they may deposit on the user, the user's clothing, or other objects. For certain infiltrants the vapors may pose a health or environmental hazard. Another problem with spraying adhesives is that the spray equipment gets coated with the adhesive and must be cleaned thoroughly after each use. This is tedious and may create health or environmental problems if the solvent for the adhesive is hazardous.

Figure 23:
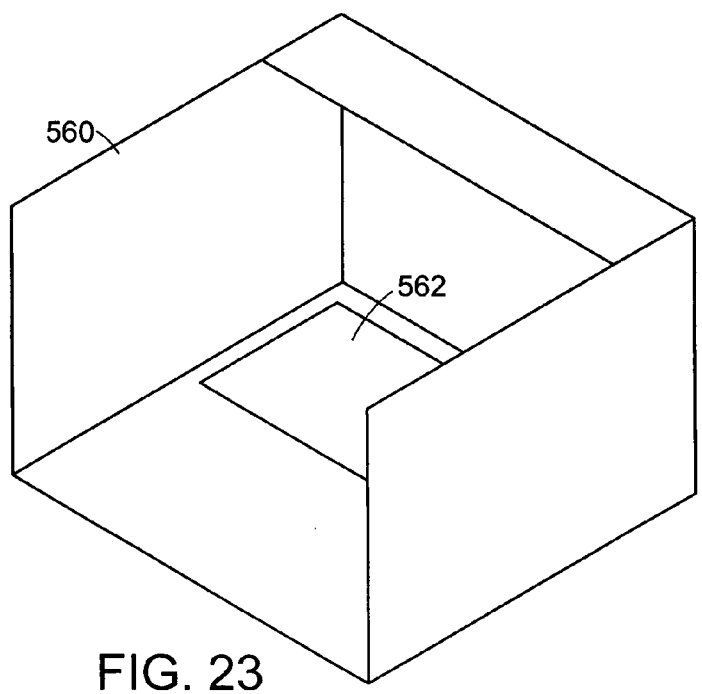
FIG. 23 is a schematic of a liner for the depowdering booth of FIG. 19.

FIG. 23 is a schematic of a liner for the depowdering booth of FIG. 19. A liner 560 protects the booth 500 from infiltrant overspray. The liner 560 includes a pre-filter 562 to capture airborne adhesive droplets to prevent them from coating the filters 524 (FIG. 20) in the depowdering booth 500. When a physical model has been depowdered in the depowdering booth 500, the user unfolds the liner 560, which is preferably made of corrugated cardboard, inside the depowdering booth 560, and sprays infiltrant on the physical model. Alternatively, the liner can be used to protect a vent hood or ductless fume hood.

Figure 24:
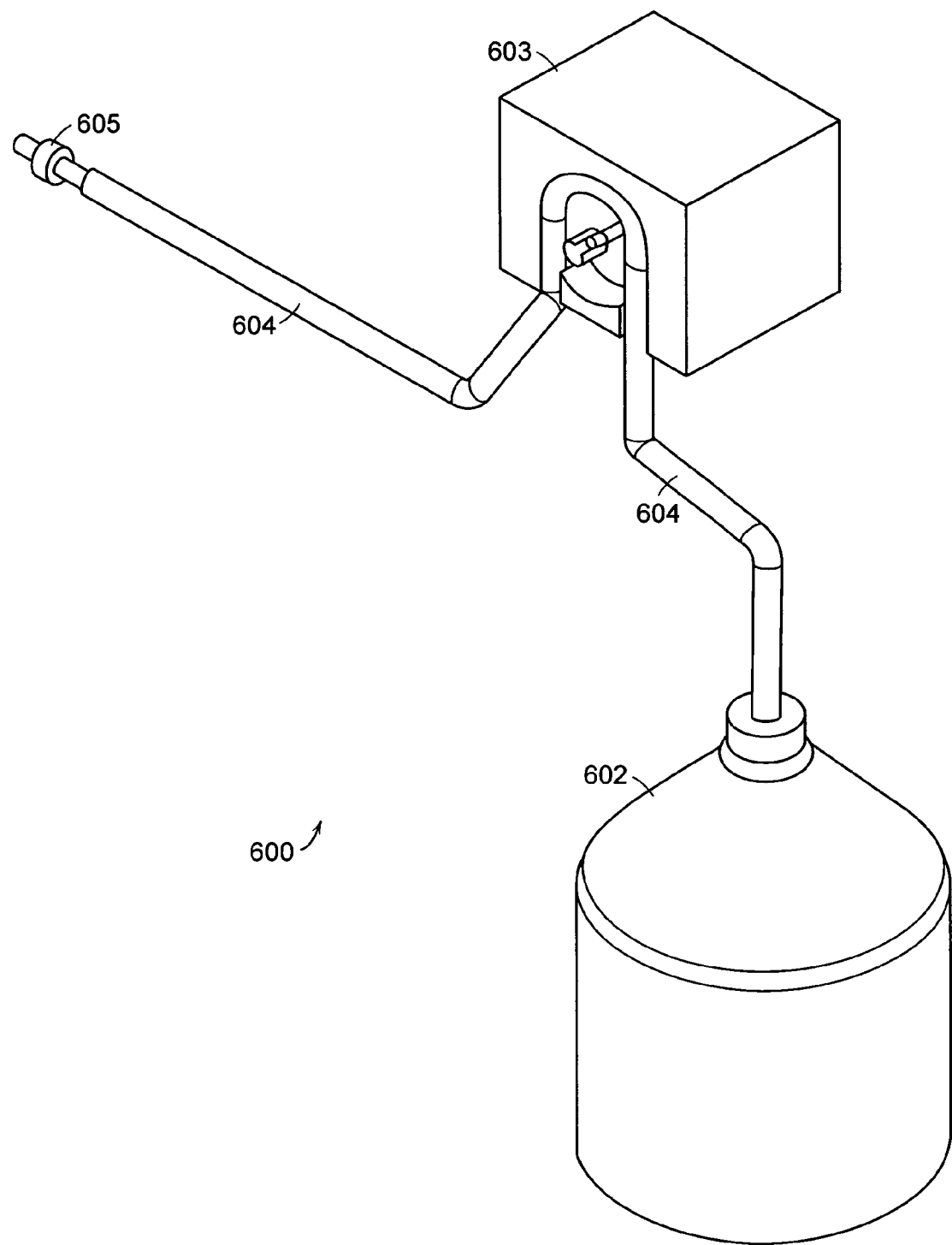
FIG. 24 is a schematic of a system for application of a resin infiltrant by spraying.

FIG. 24 is a schematic of a system for application of a resin infiltrant by spraying. In the system 600, resin is pumped through disposable tubing 604 from a infiltrant reservoir 602 by a peristaltic pump 603, and is then forced through a disposable spray nozzle 605. By using a system of disposable components and a peristaltic pump, which is not wetted by the adhesive, an inexpensive and user-friendly system for spraying adhesives is created. The clean up consists of disposing of the tubing and spray nozzle.

Figure 25:
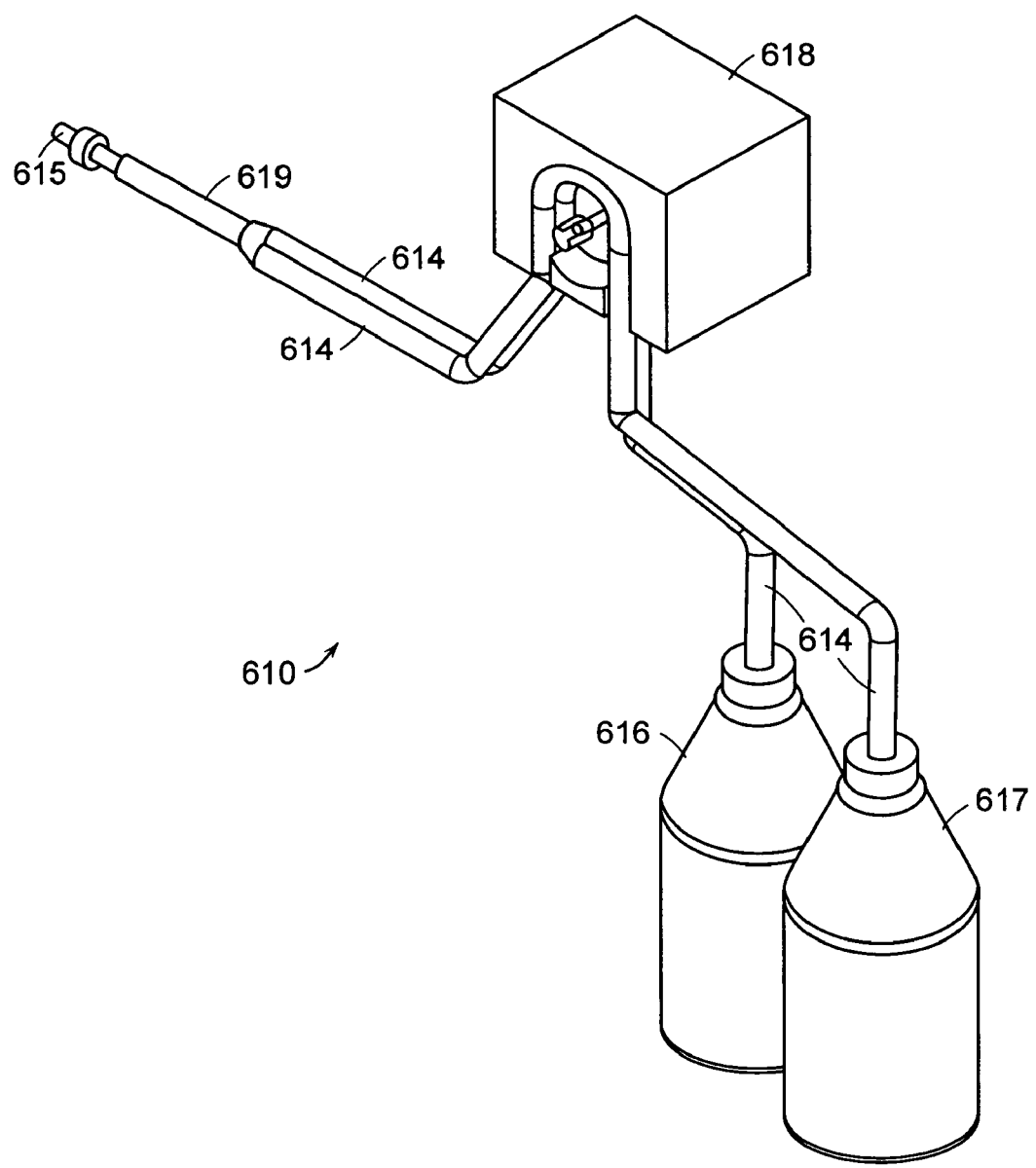
FIG. 25 is a schematic of a system for spraying a two-component infiltrant.

FIG. 25 is a schematic of a system for spraying a two-component infiltrant. A two-component infiltrant is an infiltrant that cures when the two components are combined. In the system 610, resin components are pumped through the disposable tubing 614 from infiltrant reservoirs 616, 617 by a 2-head peristaltic pump 618. The two resin components are combined in a static mixer 619 and the mixture is then forced through a disposable spray nozzle 615. The mixing ratio for the two-component system can be maintained by using an appropriate diameter for each tube. In particular, a one to one ratio for the components requires that both tubes be the same diameter.

Power Control

Piston Seal

It is important to seal the build and feed pistons so that loose powder does not leak out through the sides and fall down below the machine, which can cause unwanted mess and potentially hurt the mechanisms below.

Figure 26:
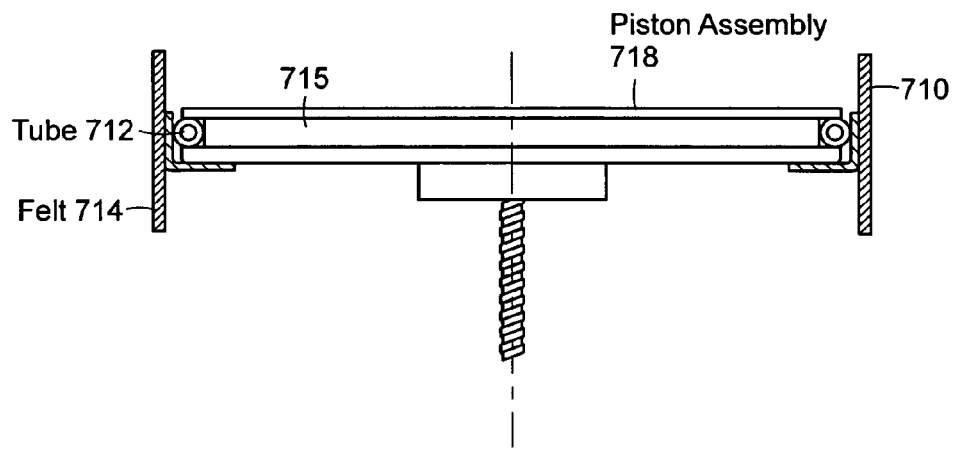
FIG. 26 is a front cross-sectional view of a sealed piston.

FIG. 26 is a front cross-sectional view of a scaled piston. As shown, an energized tube 712 pushes outward onto the felt 714 on the inner surface of a piston box 710. The tube 712 is enveloped by the piston assembly plate 715 of the piston assembly 718 on its top and side. Felt 714 is placed in between the tube seal 712 and the side of the piston box 710 to form a seal.

Powder Gutter

3-D printing involves a supply box, from which powder is fed, and a build box where part fabrication takes place. During the 3-D printing process, powder collects around these powder boxes on a surface (called the deck) until the powder can be vacuumed away. Powder that migrates during the printing process can be a nuisance and can cause performance problems with parts of the 3-D printer, in particular the printhead and the service station. For functional reasons, the printhead and the service station must be located close to the plane of the top edges of the powder boxes. If the deck is coplanar with these top edges, any powder that accumulates on the deck is potentially close to these sensitive components. Therefore, a more desirable embodiment has the surface of the deck depressed below the edges of the powder boxes, forming a gutter for the powder to fall into.

Figure 27:
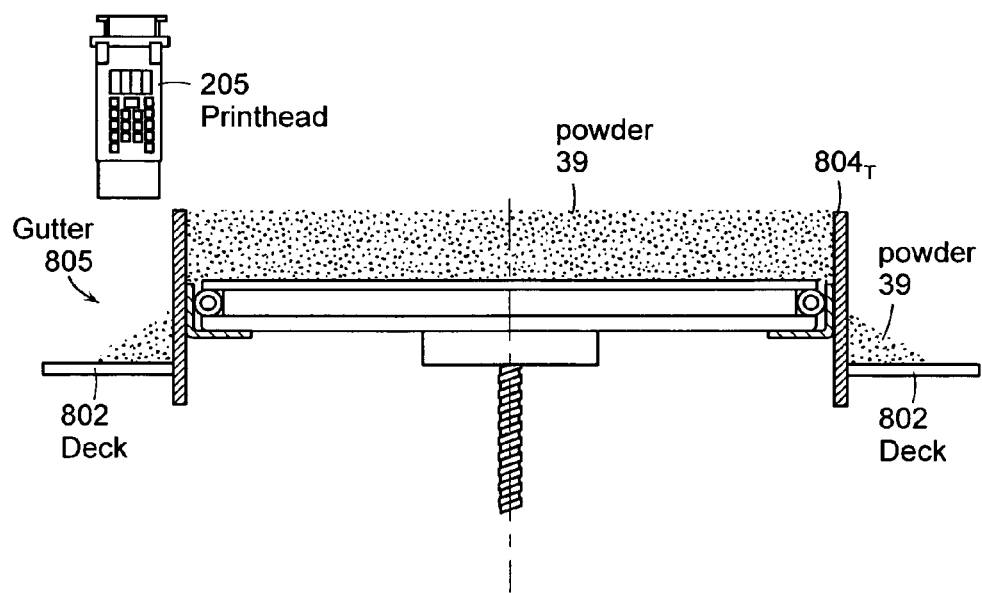
FIG. 27 is a schematic cross-section of a powder gutter.

FIG. 27 is a schematic cross-section of a powder box. The printer deck 802 is depressed below the top edges $804_T$ of the powder boxes. This configuration forms a gutter 805 where the migrated powder can collect.

Plows

Plows can prevent migrating powder from flowing off the sides of the piston boxes. One method is to use plows that are fastened to the gantry with springs, causing the plows to exert a force downward onto the top deck of the 3-D printer. A particular printer includes a plow with a small magnet inside to exert a force. This is easier to assemble and disassemble than the plow with a spring. A further improvement involves the location of the plows.

Figure 28:
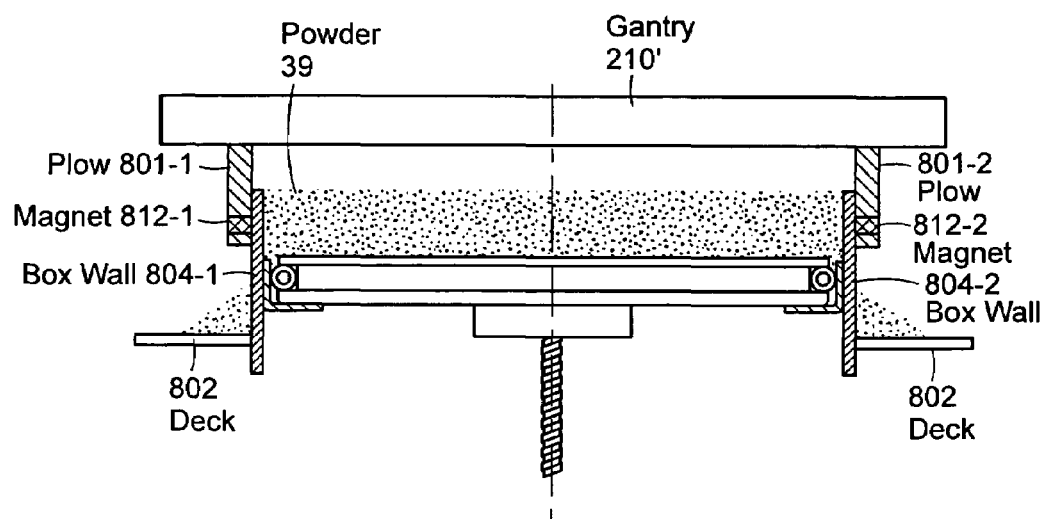
FIG. 28 is a schematic cross-section of a magnetic plow configuration.

FIG. 28 is a schematic cross-section of a magnetic plow configuration. Plows 810-1 and 810-2 are affixed to the printer gantry 210' in such a way that they are free to move perpendicular to the walls 804-1 and 804-2 of the powder boxes but are effectively fixed with respect to the gantry 210' in all other dimensions. Walls 804-1 and 804-2 are constructed of a soft magnetic material such as steel. Each plow has an embedded magnet 810-1 and 810-2 that acts upon its respective wall with enough force to keep the plow in tight contact with the wall, forming a barrier to prevent powder 39 from spilling onto deck 802 during a powder spreading operation.

Binder Supply

Gravity Feed Binder Supply

3-D printing typically utilizes commercially available printheads that were designed for 2-D printing. A special binder material that matches the powder being printed is substituted for the ink normally dispensed by the printhead. Since a typical 3-D printed part requires much more binder than can be contained inside a printhead, and since printheads cannot practically be replaced while a part is being built, it is necessary to continuously replenish the binder in the printhead while the printer is operating. This is typically accomplished by making a tubing connection between the moving printhead and a stationary supply of binder.

For a printhead to operate properly, the pressure inside the head at the entrance to the inkjet channels must be maintained at a small negative pressure, typically at a pressure between −3 and −6 inches of water. One prior art technique employs an ink supply whose free surface is maintained at a level approximately 4 inches below the printhead outlet. Printheads are available with built-in pressure regulators that maintain the required negative internal pressure while the printhead feed line pressure varies over a broad range of positive pressures. In general, enough pressure must be exerted on the binder at the supply end of the binder feed tubing to cause binder to flow through the tube at an adequate rate to keep the printhead full. The pressure required depends primarily on the restrictive characteristics of the feed tubing and the relative height of the supply with respect to the printhead. One prior art technique employs a pump that maintains the supply pressure at the inlet to the printhead. Because of its complexity, this solution is expensive and potentially unreliable.

Figure 29:
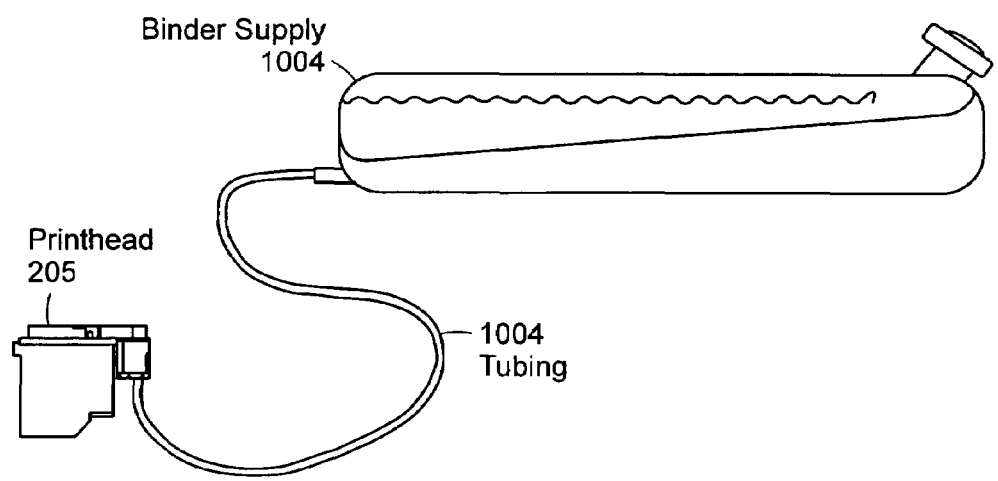
FIG. 29 is a schematic of a gravity-feed binder supply.

FIG. 29 is a schematic of a gravity feed binder supply. As shown, a stationary supply of binder 1002 is plumbed to printhead 205 through a length of tubing 1004. The binder supply 1002 is located at a sufficient height above the printhead 205 to keep the printhead supplied through tubing 1004. In particular, the free surface of the binder may vary between 3.5 and 5 inches above the bottom surface of the printhead. This height provides enough pressure to supply the printhead with binder at a rate in excess of the required 8 grams/minute through a segment of tubing having an inside diameter of 1/16 inch and a length of approximately 6 feet. Persons skilled in the art will recognize that other combinations of supply height and tubing dimensions could be selected to yield the required flow rate.

While this three-dimensional printer has been particularly shown and described with references to particular embodiments, it will be understood by those skilled in the art that various changes in form and details may be made without departing from the scope of the invention encompassed by the appended claims.

What is claimed is:

1. An apparatus for removing loose powder from the surface of a three-dimensional printed object, comprising:
an enclosure for holding the object;
a blower for creating an airflow;
at least one filter for removing powder from the airflow;
a system of ducts for channeling the airflow to the enclosure; and
a tool coupled to the ducts for blowing compressed air onto the object.

2. The apparatus of claim 1 wherein the ducts direct at least one portion of the exhaust of the blower across the opening of the enclosure to form an air curtain inhibiting powder from being ejected from the enclosure.

3. The apparatus of claim 2 wherein the ducts direct at least a portion of the exhaust of the blower throughout the enclosure to inhibit stagnant air pockets and create a generalized airflow within the enclosure.

4. The apparatus of claim 1 wherein the enclosure includes a build chamber for fabricating the object.

5. The apparatus of claim 1 further comprising a back pulse cleaner to remove powder from the filter and a chamber for receiving the removed powder.

6. The apparatus of claim 5 wherein the powder removed from the filter is automatically recycled by a vacuum system.

7. The apparatus of claim 1 further comprising a powder gutter.

8. The apparatus of claim 7 further comprising a moveable plow member in communication with the powder gutter.

9. A method of removing loose powder from the surface of a three-dimensional printed object, the method comprising:
holding the object in an enclosure;
creating an airflow;
removing powder from the airflow with at least one filter;
channeling the airflow to the enclosure through a system of ducts; and
operating a tool coupled to the ducts for blowing compressed air onto the object.

10. The method of claim 9 wherein channeling comprises directing at least one portion of the exhaust of the blower across the opening of the enclosure to form an air curtain inhibiting powder from being ejected from the enclosure.

11. The method of claim 10 wherein channeling comprises directing at least a portion of the exhaust of the blower throughout the enclosure to inhibit stagnant air pockets and create a generalized airflow within the enclosure.

12. An apparatus for removing loose powder from the surface of a three-dimensional printed object, comprising:
a means for holding the object in an enclosure;
a means for creating an airflow;
a means for removing powder from the airflow with at least one filter;
a means for channeling the airflow to the enclosure through a system of ducts; and
a means for operating a tool coupled to the ducts for blowing compressed air onto the object.

* * * * *